US005379513A

United States Patent [19]

Thompson et al.

[11] Patent Number: 5,379,513

[45] Date of Patent: Jan. 10, 1995

[54] AUTOMATED NAILING DEVICE

[75] Inventors: Terrence L. Thompson, Minneapolis, Minn.; Jack W. Gresham, Armuchee, Ga.

[73] Assignee: Viking Engineering & Development, Incorporated, Fridley, Minn.

[21] Appl. No.: 950,253

[22] Filed: Sep. 24, 1992

[51] Int. Cl.[6] .......................... B23P 21/00; B27F 7/09

[52] U.S. Cl. ...................................... 29/772; 29/432.1; 29/794; 227/45; 269/910

[58] Field of Search ..................... 29/281.3, 432, 432.1, 29/784, 786, 794, 795, 799, 432.2, 715, 772, 897.31; 227/45, 78, 99, 100, 110, 112; 269/910

[56] References Cited

U.S. PATENT DOCUMENTS

| | | | |
|---|---|---|---|
| 3,625,305 | 12/1971 | Mueller et al. | 182/46 |
| 3,765,587 | 10/1973 | Davis | 227/45 X |
| 3,826,188 | 7/1974 | Eberle | 269/910 X |
| 3,945,549 | 3/1976 | Colson | 227/45 |
| 4,111,114 | 9/1978 | Carr | 269/910 X |
| 4,168,566 | 9/1979 | Streckert | 29/432 |
| 4,403,388 | 9/1983 | Belcher | 29/432 X |
| 4,487,355 | 12/1984 | Ginnow et al. | 227/112 |
| 4,627,564 | 12/1986 | Bowser | 269/910 X |
| 4,782,989 | 11/1988 | Wallin et al. | 227/149 |
| 4,867,364 | 9/1989 | Wallin et al. | 227/7 |

*Primary Examiner*—Peter Dungba Vo
*Attorney, Agent, or Firm*—Kinney & Lange

[57] ABSTRACT

A device for driving nails in at least one selected nailing pattern into an arrangement of components is disclosed. The device includes a frame, a retaining means for retaining an arrangement of components to be nailed in the frame, a nailing means comprising a plurality of movable nailing heads for delivering nails in the selected nailing pattern to the arrangement, a nail delivery means for delivering nails to the nailing heads, means for causing at least one of the nailing heads to move in a direction transverse to a machine direction relative to the nailing surface during a nailing operation, means for causing the nailing heads to move in a machine direction and in an opposite direction relative to the arrangement of components and means for causing the nailing heads to move in a direction normal to a machine direction.

25 Claims, 14 Drawing Sheets

AUTOMATED NAILING DEVICE

BACKGROUND OF THE INVENTION

The present invention relates to an apparatus and method for driving nails. In particular, it relates to a device for driving a plurality of nails according to a preselected pattern.

Devices which automatically drive a preselected pattern of nails into an arrangement of components are known. One such device is an automated pallet nailer. The known pallet nailer includes a carriage for retaining an arrangement of wood boards and blocks to be nailed together, retaining brackets for gripping the arrangement and holding the arrangement on the carriage during nailing, a nailing station for driving a plurality of nails into an upper surface of the arrangement, a conveyor for driving the carriage under a nailing station, and a computer for controlling the sequence and timing of the various operating steps.

Devices known in the art do not provide means for automatically moving the nailing heads in a direction transverse to the direction of travel of the carriage during nailing to an infinitely variable number of positions. Known devices therefore cannot be programmed to deliver nailing patterns which are other than linear in a direction of travel of the carriage from a single nailing head. Known devices also cannot be programmed to change from one nailing pattern applied to one pallet surface to another if the different patterns require changes in transverse positioning of the heads between nailing operations other than to a finite number of discrete positions.

Block pallet nailers known in the art provide two to three nailing heads for each board comprising the surface being nailed. Current machine designs require the operator to arrange the components such that the boards comprising the top surface of the arrangement to be nailed are positioned with a long dimension in a direction of travel of the carriage. Since there are almost always more top boards than lower support boards or "stringer boards", which are perpendicular to the top boards, this nailing arrangement typically requires a large number of nailing heads. When nailing conventional double sided pallets, the number of boards comprising an upper surface is seven. Therefore, fourteen or twenty-one nailing heads are required, depending upon board size, for operating a known pallet nailer when producing such a product. Since the amount of downtime due to equipment malfunction is directly related to the number of nailing heads, it would be desirable to reduce the number of nailing heads in a pallet nailing machine.

SUMMARY OF THE INVENTION

The present invention is a device for driving nails in a selected nailing pattern into an arrangement of components to be nailed. The device of the present invention advantageously requires fewer nailing heads than known devices to deliver nails in a selected nailing pattern to an arrangement of component for forming a block pallet. The device of the present invention includes a frame and retaining means for retaining the arrangement of components to be nailed within the frame. In the preferred embodiment, the retaining means comprises a movable carriage. The present invention includes a nailing means comprising a plurality of movable nailing heads mounted to the frame for delivering a selected nailing pattern to the nailing surface.

The present invention includes a nail delivery means for delivering nails to the nailing heads, and a means for causing at least one of the nailing heads to move in a direction transverse to a machine direction relative to the nailing surface during a nailing operation. Also included is a means for causing the nailing heads to move in a machine direction relative to the arrangement of components and in a direction opposite the machine direction. In the preferred embodiment, a conveyor is provided to move a carriage in a machine direction beneath a nailing station.

The present invention also includes a means for causing the nailing heads to move in a direction normal to a machine direction relative to an arrangement of components and in an opposite direction.

An automated method of nailing pallets in a single nailing operation which simultaneously uses a plurality of nailing heads is also disclosed. The method includes the steps of forming an arrangement of components to be nailed comprising a plurality of adjacently positioned surface boards and a plurality of stringers positioned substantially perpendicular to the surface boards, selecting a first nailing pattern for nailing together at least one of the surface boards and stringers, positioning the relative position of a plurality of nailing heads and the arrangement such that each nailing head travels generally along a surface of each stringer; and nailing through the surface and stringer boards along each stringer board during a single nailing operation.

DETAILED DESCRIPTION OF THE PREFERRED EMBODIMENT

The present invention is a device for driving a plurality of nails in a selected nailing pattern into an arrangement of components to be nailed together in a single nailing operation. A preferred device of the present invention is adapted to automatically nail pallets for use in transporting and storing a wide variety of products.

For purposes of this disclosure, a "nailing pattern" is a top plan view of the location of a group of nails which have been pounded through a surface of an arrangement of components. The present invention can be used to deliver a first nailing pattern to a first surface of a sub-assembly of elements, and after inverting and adding additional boards, delivering a second nailing pattern which differs from the first nailing pattern to a second opposite surface of a complete assembly of elements. The second nailing operation can be executed directly after the first without shutting down the machine to change the location of the nailing heads. Such a device has the advantage of minimizing downtime, and allowing for great flexibility in production scheduling. Also, since the nailing heads are movable during the nailing sequence, it is possible to deliver individual nailing patterns from a given nailing head in a machine direction which are other than linear and were not possible before the discovery of the present invention. For example, the preferred device can be programmed to deliver a circular nailing pattern using a plurality of nailing heads, for example. The present invention advantageously uses fewer nailing heads than known nailing devices because of the great flexibility in varying nailing patterns.

Figure 1:
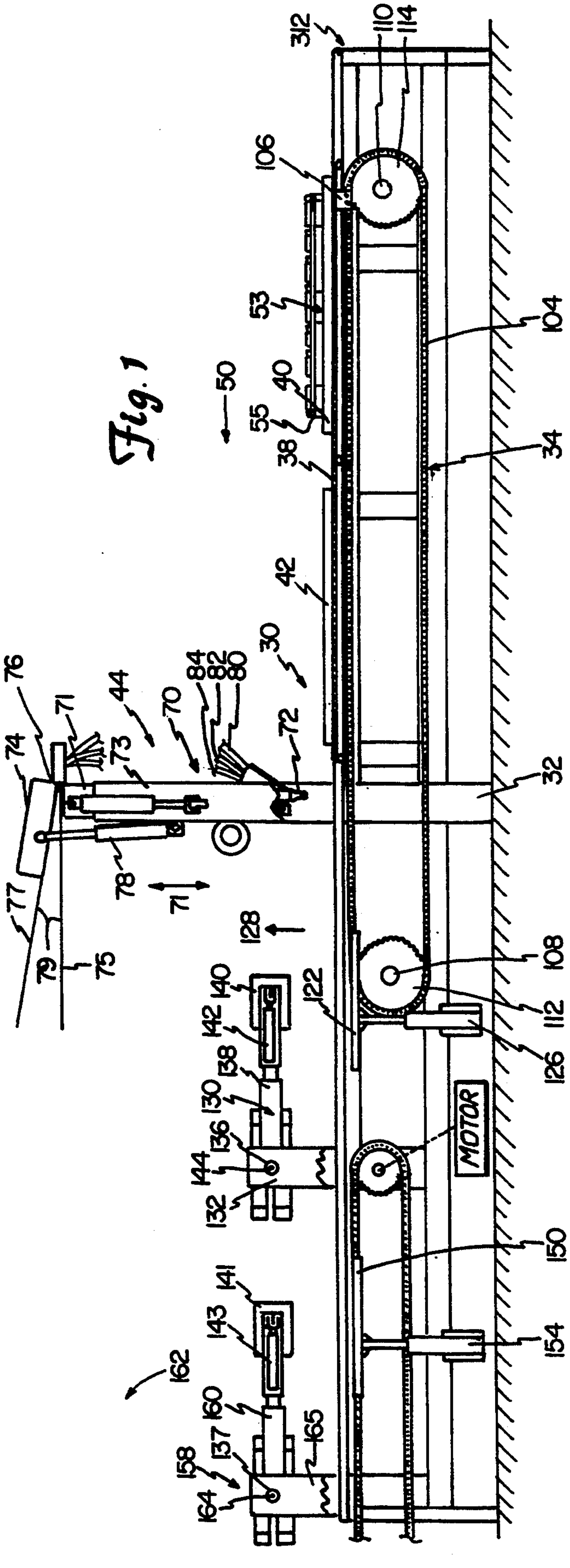
FIG. 1 is a side-elevational schematic view of a preferred device of the present invention.

A side schematic view of a preferred device of the present invention is shown generally in FIG. 1. The most preferred device of the present invention is a pallet nailer 30. However, the preferred device is not limited for use as a pallet nailer. For example, the device of the present invention may be used to nail materials other than wooden boards, such as cardboard, chipboard, drywall, masonite and other materials which can be nailed. The device of the present invention may also be used to nail other types of assemblies such as box frames, wood fencing and cable reel ends, for example.

The pallet nailer 30 of the preferred embodiment of the present invention includes a frame 32 and a retaining means for retaining an arrangement of components to be nailed within the frame. The frame is preferably formed of structural steel and is of welded construction. In the preferred embodiment, the means for retaining an arrangement of components includes a horizontally disposed carriage 38 mounted for sliding engagement in the frame 32.

Figure 2:
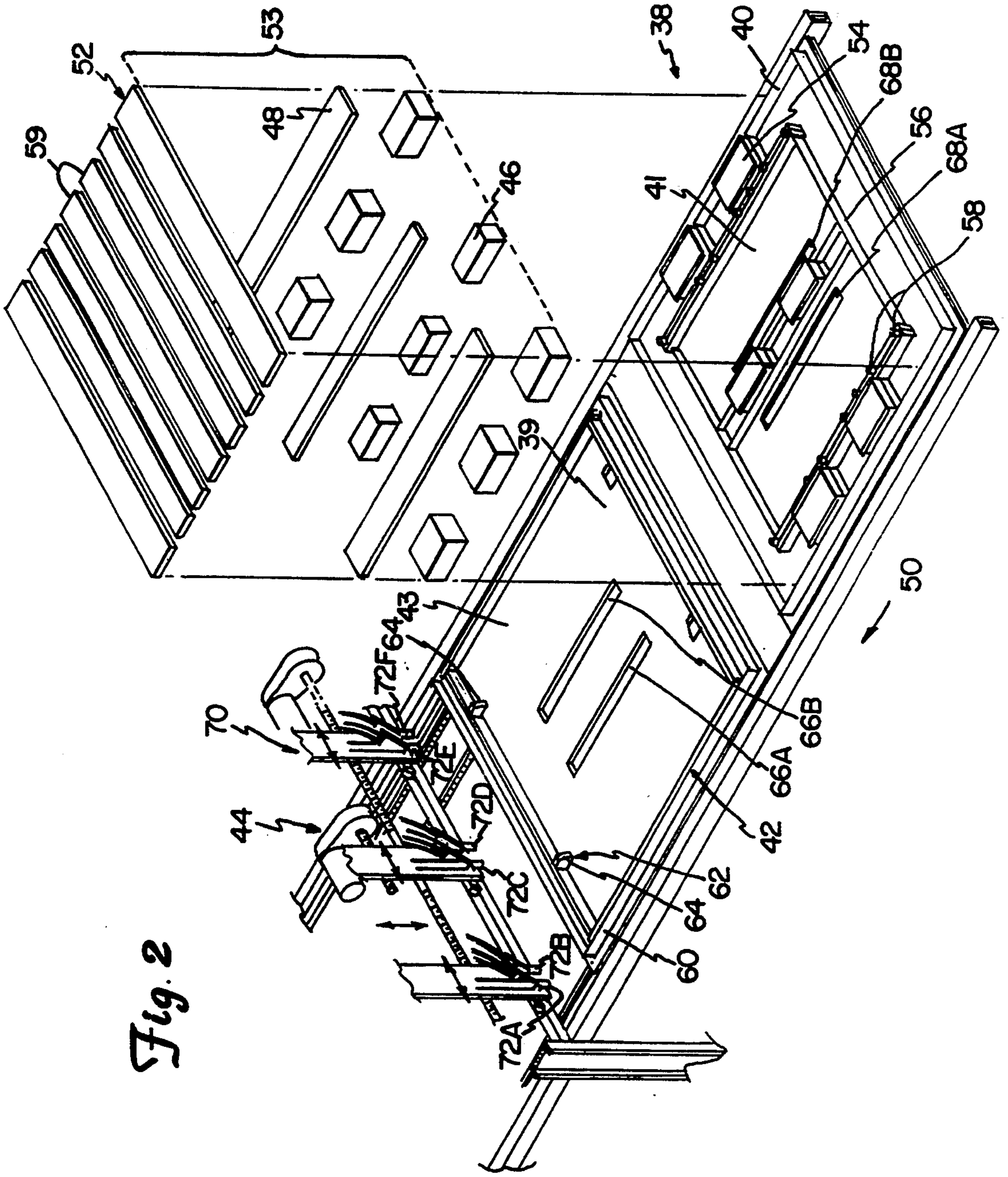
FIG. 2 is a perspective view of the carriage of the preferred embodiment showing an exploded view of an arrangement of components to be nailed.

FIG. 2 is a perspective view of the carriage 38 of the preferred embodiment of the present invention showing an exploded view of an arrangement of components to be nailed. The carriage 38 is substantially flat and includes means for retaining at least one arrangement of components to be nailed on an upper surface of the carriage. In the preferred embodiment, a first set of tooling 40 and a second set of tooling 42 are removably mounted to an upper surface of the carriage 38 for retaining the arrangement of components to be nailed. A nailing station 44 is provided for driving nails into the arrangement of components in the preferred embodiment. The nailing station 44 will be described in detail below. The first set of tooling 40 is located further away from the nailing station 44 than the second set of tooling 42 when the carriage is in the "home" position, shown in FIG. 2. The first set of tooling 40 is adapted to receive a group of nine blocks 46, a group of stringer boards 48 positioned with a long dimension arranged in a direction of travel (hereinafter "machine direction") of the carriage as shown by arrow 50, and a first group of surface boards 52 defining a first nailing surface positioned above the stringer boards 48 and arranged in a direction transverse to a direction of travel 50 of the carriage 38. The arrangement comprising the surface boards 52, stringer boards 48, and blocks 46 is collectively referred to as the block pallet sub-assembly 53. Before activating the device of the present invention, an operator manually loads the sub-assembly 53 in the first tooling 40.

Although the direction of travel of the carriage 38 during nailing is shown by arrow 50, the carriage 38 also moves in a direction opposite the direction of travel of the carriage 38 between nailing operations. A "nailing operation" for purposes of this disclosure is a sequence of nailing steps required to apply a plurality of nails in a single nailing pattern through a surface of an arrangement of components. In the case of a pallet, one nailing operation would include all hits required to apply every nail to an upper nailing surface 59 of the pallet sub-assembly 53. Pallets which are two-sided require two nailing operations as will be described in more detail below. The preferred device of the present invention, as described, nails double-sided block pallets. However, the device may be used to nail single-sided pallets and other nailed products as well.

The first tooling 40 and second tooling 42 have outer frames constructed of welded steel angle iron in the preferred embodiment. A novel aspect of the first tooling 40 is that anvil means are provided to aid in the nailing process. The preferred anvil means include three pairs of anvils 54 which are substantially flat plates of steel positioned between the blocks 46 in the sub-assembly 53 and which provide a contact surface for the nails which are driven into the boards 48 and boards 52 but not into a block 46. When this is the case, it is desirable to use a nail which is slightly longer than the combined thickness of boards 48 and 52 such that when the sharp end of the nails contact the anvils, the tips bend, forming a stronger connection than if the nails remained substantially straight after nailing. This operation is referred to as "clinch nailing". The anvils 54 are formed from a sheet of carbon steel which is approximately $\frac{1}{4}$ inch thick. The anvils 54 are supported on a steel inner frame 56 which is in integral part of the first tooling 40 in the preferred embodiment.

Disposed on an upper surface of the inner frame 56 are a plurality of upwardly projecting spacers 58 which function as guides in the placement of the surface boards 52 of the pallet sub-assembly 53 in the tooling 40.

The tooling 40 in the preferred embodiment is adapted for snugly receiving a pallet of a single selected size and configuration. However, tooling that is adaptable for a variety of different pallet sizes and configurations can be mounted onto an upper surface of the carriage 38 of the preferred embodiment.

The second tooling 42 preferably has a structure which is different than the structure of the first tooling 40 in the preferred embodiment. The second tooling 42 has an outer frame 60 which is of a size and shape to accept the nailed pallet sub-assembly 53 which has been nailed together while in the first tooling 40, and which has been turned over such that the surface which was nailed in the first tooling 40 defining the first nailing surface during a first nailing operation faces downward in the second tooling 42. The components used for transferring the arrangement of nailed components from the first tooling 40 to the second tooling 42 will be described in more detail below.

The second tooling 42 includes a plurality of ears 62, each having an angled surface 64 which assists in centering the nailed arrangement in the second tooling 42 when the nailed pallet sub-assembly 53 is lowered into the tooling 42. The sub-assembly 53 preferably fits snugly in the tooling 42.

The carriage 38 of the preferred embodiment is formed of a substantially flat plate 39 and includes two pair of elongated, substantially rectangular openings 66A, 66B and 68A and 68B extending through the plate 39 which are needed to remove the nailed sub-assemblies from the tooling 40 and completed pallets from the tooling 42. The precise function of openings 66A, 66B, 68A and 68B are described in more detail below.

Referring back to FIG. 1, the present invention includes a nailing means having a plurality of movable nailing heads 72 for delivering a preselected pattern of nails to a nailing surface of an arrangement of components. In the preferred embodiment, a nailing station 44 is provided which includes an upper support frame assembly 70. The support frame assembly includes a first movable member 71 and a second stationary member 73. The stationary member 73 is fixedly mounted to the frame 32 and the first movable member 71 slides vertically in the stationary member 73. The movable member 71 moves in the "Z" direction as shown by arrow 71. The movable member 71 supports a plurality of nailing heads 72. In the preferred embodiment, three pairs of nailing heads are supported by the movable member 71. A detailed description of the movable member 71, nailing heads 72, and respective mounting arrangement will be described in more detail below.

The present invention includes a nail delivery means for delivering nails to the nailing heads. The nail delivery means of the preferred embodiment includes a nail pan 74. The nail pan 74 is mounted for pivotal rotation about an axis 76 (into the paper). A hydraulic cylinder 78 is mounted at a first end to an upper portion of the stationary portion 73 of the upper support frame assembly 70. The hydraulic cylinder 78 is mounted at the opposite end to a portion of the pan 74 in a location on the pan spaced apart from the axis 76. The hydraulic cylinder 78 adjusts an angle 79 defined by the intersection of a horizontal plane 75 and a plane 77 which contains a lower surface of the pan 74. By adjusting the angle 79, a wide variety of nails can be delivered continuously to the nailing heads 72.

A novel feature of the present invention is that the device is capable of feeding a variety of nail sizes to a single nailing head during one nailing operation. In other words, the machine can deliver different size nails to the same nailing head 72 while delivering nails in a single nailing pattern. In the preferred embodiment, each nailing head 72 includes three nail tracks 80, 82 and 84, each provided for supplying a different size nail to the same nailing head 72. Each nail track 80, 82 and 84 in the preferred embodiment is tubular in shape and preferably formed from flexible plastic tubing. According to the preferred embodiment, the nailing heads 72 and tracks 80, 82 and 84 are mounted on the movable portion 71 of the upper support frame assembly 70. The nail tracks 80, 82 and 84 are part of the nail delivery means for delivering nails to the nailing heads of the present invention.

Figure 3:
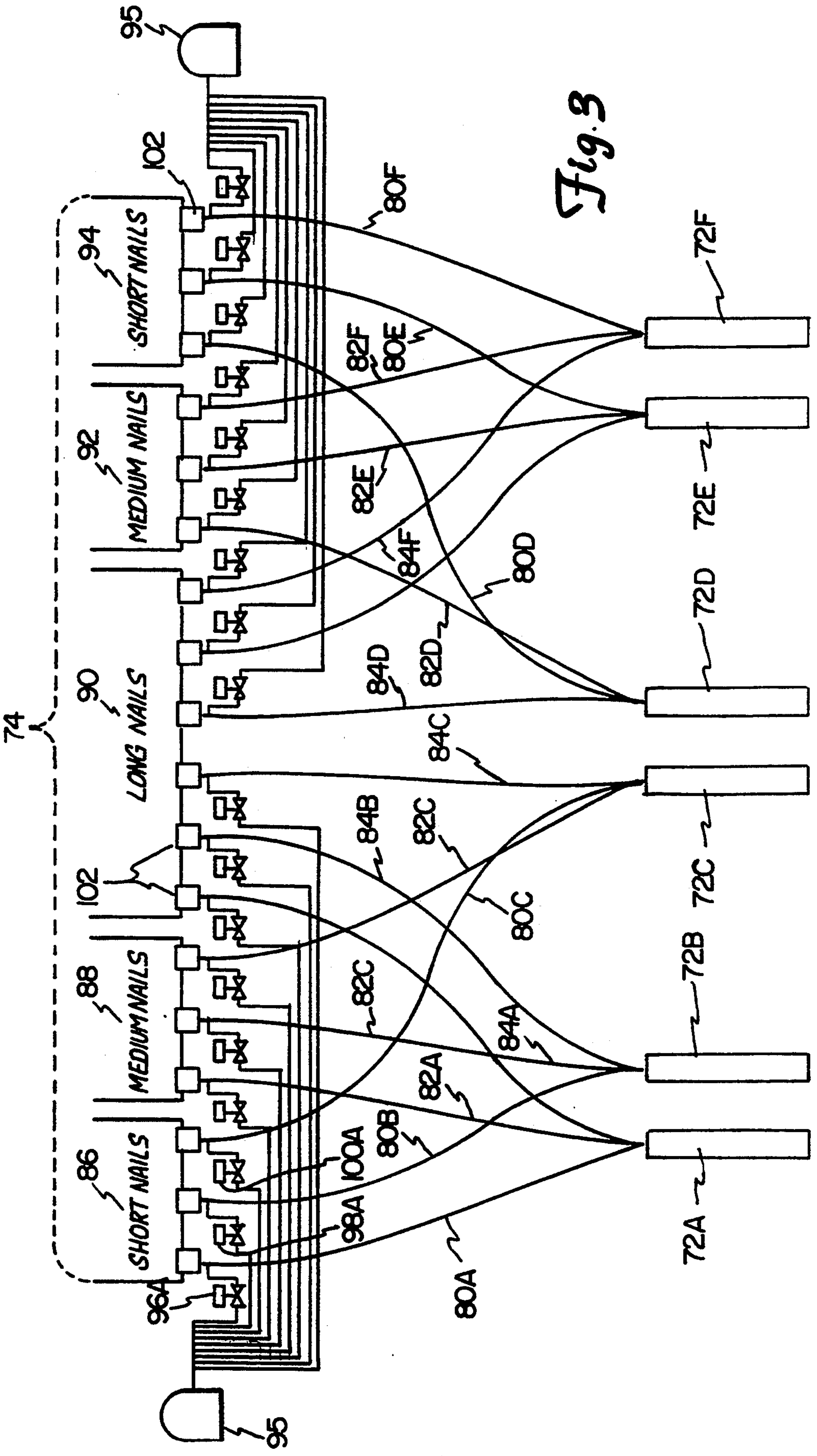
FIG. 3 is a schematic view of the nail pan, nail tracks, and nail heads of the preferred embodiment.

FIG. 3 is a schematic drawing of a preferred nail delivery means of the present invention. The pan 74 is separated into a number of sectors 86, 88, 90, 92 and 94 each for receiving a selected size nail. In the preferred embodiment, sectors 86 and 94 are adapted to receive short nails for clinch nailing, sectors 88 and 92 are adapted to receive medium nails for nailing through stringer boards and into blocks, and sector 90 is adapted to receive long nails for nailing through surface boards, stringers and into blocks. According to the preferred embodiment, six nailing heads are provided labeled as 72A through 72F, respectively. Nail tracks 80A, 80B, 80C, provide passageways from sector 86 of the pan 74 containing the short nails to each nailing head 72A through 72C, respectively. Nail tracks 80D, 80E and 80F provide passageways from sector 94 of the pan to each nailing head 72D through 72F. Similarly, nail tracks 82A, 82B and 82C provide a passage from sector 88 of the pan 74 containing the medium sized nails to the nailing heads 72A through 72C, respectively. Nail tracks 82D, 82E and 82F provide a passage from sector 92 to nailing heads 72D through 72F, respectively. Nail tracks 84A, 84B, 84C, 84D, 84E and 84F provide passages between the sector 90 of the pan 74 containing the long sized nails to each of the nailing heads 72A through 72F, respectively. In the preferred embodiment, each nail track 80, 82 and 84 is formed of conventional tubing such as silicone tubing.

Between each sector, 86, 88, 90, 92, and 94 and the nail tracks 80, 82 and 84 are a plurality of control means for controlling the rate at which the nails are delivered to the nailing heads 72A through 72F, respectively. In the preferred embodiment, the control means comprises a plurality of nail picker plates 102. Suitable nail picker plates 102 are known in the art and are pneumatically controlled and deliver a nail to the fluidly connected nail track in response to a signal from the controller.

The preferred device of the present invention also includes an air supply 95 for injecting air into each nail track. The computer means sends a signal to one of the control values 96A, 98A and 100A which sends a puff of air through one of the nail tracks 80A, 82A and 84A behind the dropped nail to propel the nail through one of the tracks 80A, 82A and 84A. The remaining tracks are similarly equipped with a supply line of air and a control valve.

The present invention includes a means for causing the nailing heads 72 to move in a machine direction relative to the arrangement of components and in a direction opposite the machine direction. A preferred means comprises a conveyor 34 for moving the carriage 38 as shown in FIG. 1. The first conveyor 34 is mounted within the frame 32 for moving the carriage 38 in a direction shown by arrow 50 and in a direction opposite the direction shown by arrow 50. The first conveyor 34 includes a pair of horizontally spaced apart drive chains 104 each having a path located within a vertical plane. Each chain 104 is fixedly connected to the carriage 38 by means of a bracket 106. The first conveyor 34 includes a pair of spaced apart shafts 108 and 110 which are mounted horizontally for rotation within the frame 32 and transverse to a direction of travel of the carriage 38 (shown by arrow 50). The direction represented by arrow 50 for purposes of this disclosure is the "machine direction". Fixedly mounted onto shaft 108 is a pair of spaced apart sprockets 112 for causing the chain 104 to rotate in response to power input to shaft 108 which will be described in more detail below. Similarly, fixedly mounted onto shaft 110 are a pair of spaced apart sprockets 114 which support opposite ends of the pair of chains 104.

Figure 4:
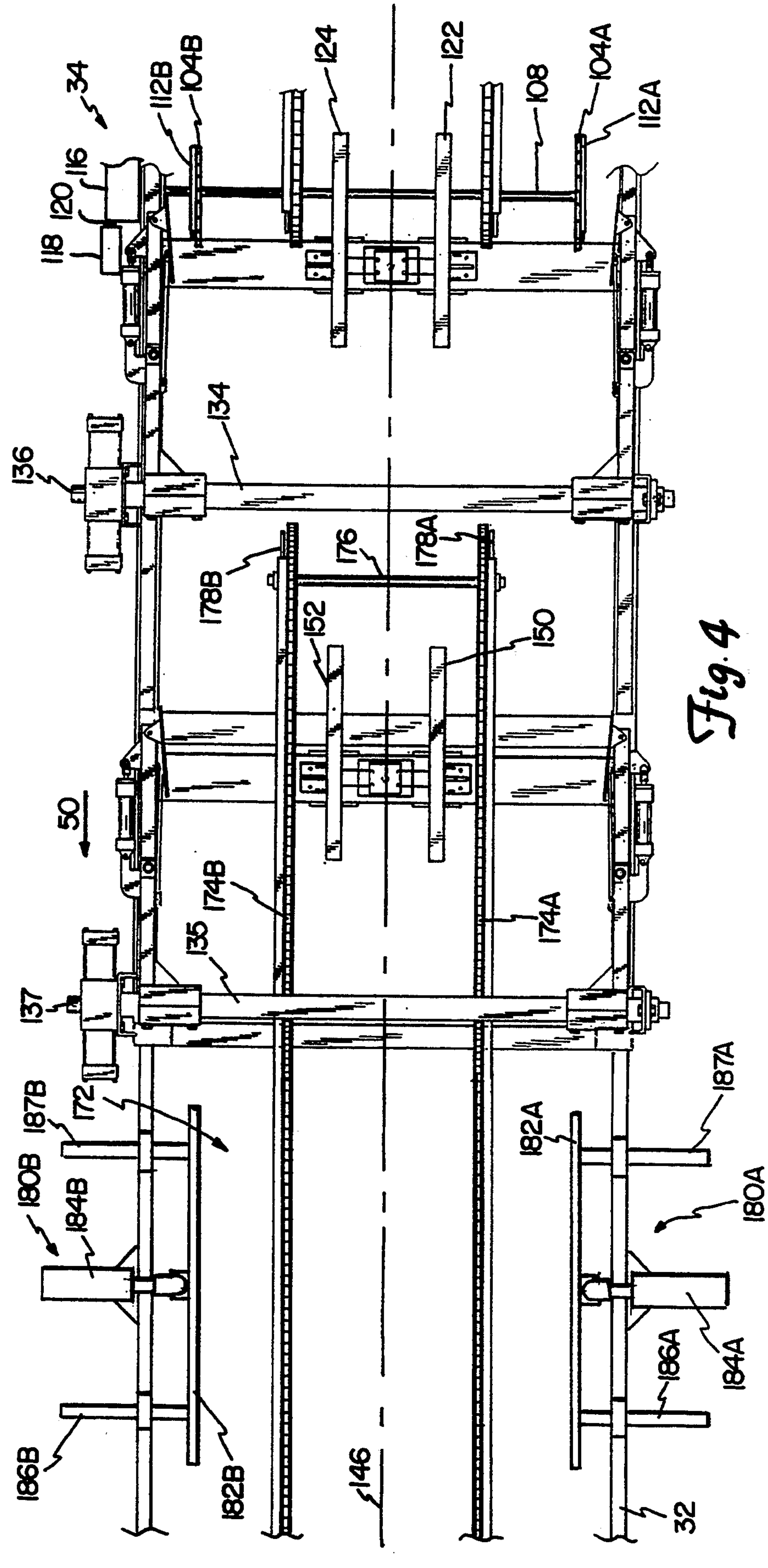
FIG. 4 is a detailed top-plan view of a central portion of the preferred embodiment of the present invention.

FIG. 4 is a top-plan view of the device of the present invention showing a portion of the first conveyor 34 in more detail- Mounted to the rotational shaft 108 and the frame 32 is a gear box 116. A servo motor 118 is mounted to the gear box 116. In the preferred embodiment, the computer means sends a signal to the servo motor 118 causing an output shaft 120 to rotate, which in turn causes the shaft 108 to rotate until the carriage 38 attached by means of the brackets 106 (shown in FIG. 1) arrives at a predetermined location. The servo motor 118 in the preferred embodiment is bi-directional and includes a speed adjustment feature. It is to be understood that the operation of the first conveyor 34 is intermittent while the device of the present invention is in operation.

Figure 6:
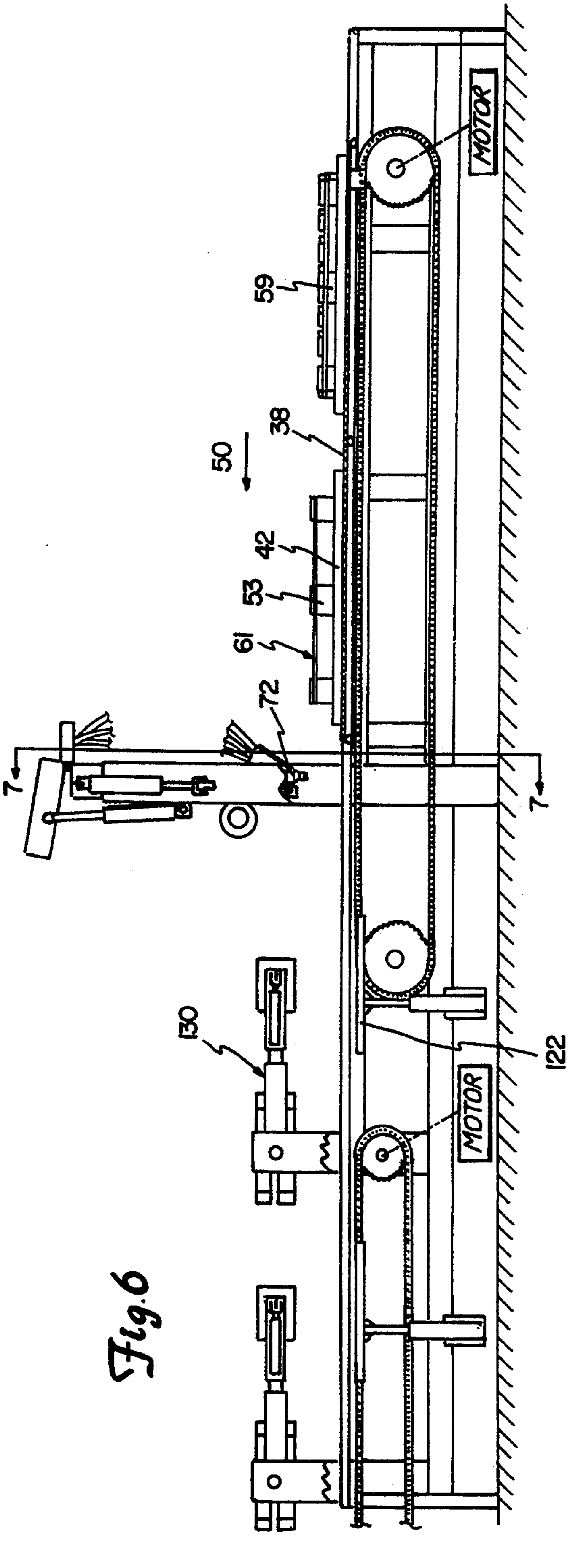
FIG. 6 is a schematic side-elevational view of the preferred device showing the carriage in the "home" position loaded with a complete pallet assembly and a sub-assembly.
Figure 7:
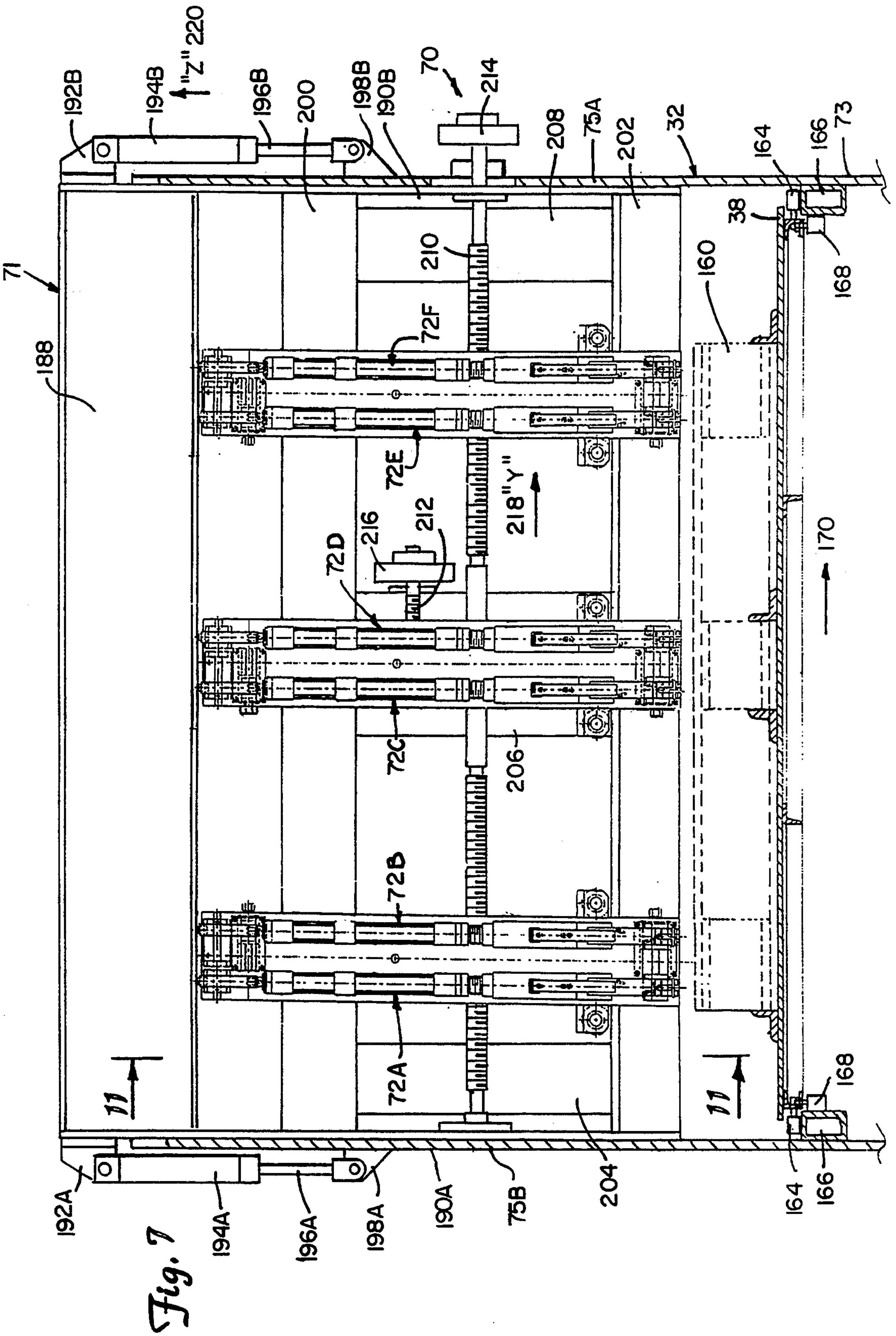
FIG. 7 is a cross-sectional view of the device of the preferred embodiment taken through line 7—7 as shown in FIG. 6.

FIG. 7 is a cross-sectional view of the preferred embodiment showing the carriage 38 of the present invention taken along line 7—7 as shown in FIG. 6. As seen in this Figure, the carriage 38 is supported by a plurality of horizontally disposed guide wheels 164 which travel on an upper surface of a pair of horizontal rails 166 fixedly mounted to the frame 32. Vertically disposed wheels 168 are also provided for contacting an inner surface of the rails 166 and prevent the carriage 38 from moving in a transverse direction as shown by arrow 170.

Although the preferred means for causing the nailing heads to move in a machine direction relative to the arrangement of components is a first conveyor 34 which moves the carriage 38, it is to be understood that the present invention also contemplates holding the means for retaining the arrangement of components to be nailed stationary within the frame while providing a conveyor or other equivalent means for moving the nailing station 44 (shown in FIG. 1) in the machine direction shown by arrow 50 and in an opposite direction.

Figure 5:
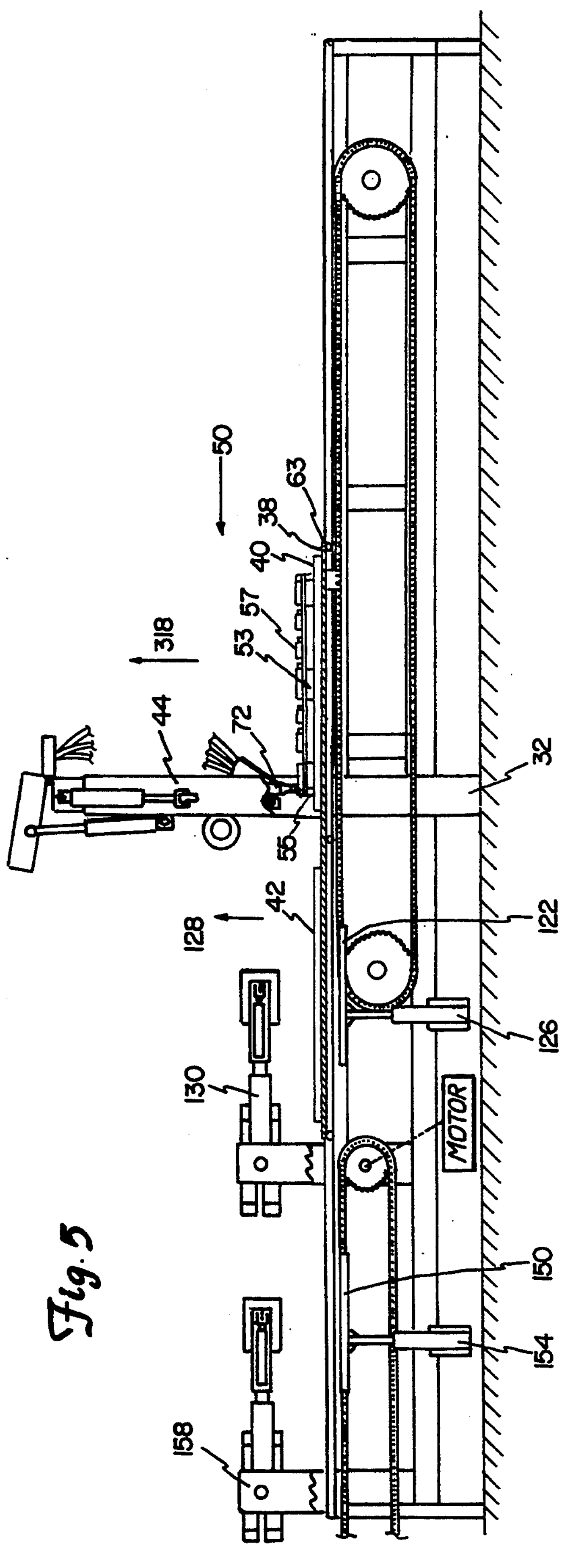
FIG. 5 is a schematic side-elevational view of the preferred device showing the carriage advanced to a position for nailing.

In FIG. 1, the carriage 38 is shown in the "home" position. In operation, the first conveyor 34 moves the carriage 38 of the preferred embodiment of the present invention supporting a loaded sub-assembly 53 of the production run toward the nailing station 44 as shown in FIG. 5. During the nailing operation, the carriage 38 moves from "home" position (shown in FIG. 1) in the direction shown by arrow 50. The second tooling 42 is empty since the sub-assembly 53 is the first pallet being manufactured. The carriage 38 advances until a front edge 55 of the sub-assembly 53 reaches the nailing station 44. A programmable computer means (not shown) instructs the servo motor 118 (shown in FIG. 4) to advance the carriage 38 beneath the nailing heads 72 to a plurality of preselected locations and to deliver nails to a first upper nailing surface 57 according to a first selected nailing pattern.

At the conclusion of the nailing operation, the carriage 38 continues to move in the direction shown by arrow 50 until the rear openings 68A, 68B (shown in FIG. 2) extending through the plate 39 of the carriage 38 and within the area proximate the first tooling 40 is located directly above a pair of horizontally spaced lifting arms 122. A rear edge 63 of the carriage 38 at this point is no longer beneath the nailing station 44. The carriage 38 is in the "forward position" at this point (not shown).

The preferred device of the present invention includes a means for removing nailed arrangements of components from the means for retaining the arrangement of components in the frame. In the preferred embodiment, a first pair of gripping arms 130 and first pair of lifting arms 122 are providing for inverting and transferring the nailed sub-assembly 53 from the first tooling 40 to the second tooling 42. The nailed sub-assembly 53 is transferred from the first tooling 40 by means of gripping arms 130 and lifting arms 122 while the carriage 38 remains stationary in the "forward" position. The lifting and turning operations will be described in detail below. The programmable computer means instructs the servo motor 118 (shown in FIG. 4) after turning and lifting to return the carriage 38 to the "home" position for reloading. At this point, the nailed sub-assembly 53 has been inverted and is positioned in the second tooling 42. The first tooling 40 is empty.

As shown in FIG. 6, a new sub-assembly 59 is placed into the first tooling 40, and then additional stringers and surface boards are added to the nailed, inverted sub-assembly 53, forming a complete pallet assembly 61 which is ready for nailing. The servo motor 118 (shown in FIG. 4) instructs the carriage 38 to move in a direction shown by arrow 50, to execute a second nailing operation on pallet assembly 61 and then return to the first nailing operation for nailing new sub-assembly 59.

The device of the present invention preferably requires two operators, one for loading each tooling 40 and 42. The device preferably includes safety switches which allow either operator to independently turn off the machine.

The preferred means for removing nailed arrangements of components from the means for retaining the arrangement of components will be described in more detail below. Referring back to FIG. 1, in the preferred embodiment, two pairs of spaced apart lifting arms 122, 124 (shown in FIG. 4) and 150, 152 (shown in FIG. 4) are provided which are movably mounted to the frame 32 and which move vertically upward to lift the nailed arrangements off of the carriage 38. Each pair of lifting arms 122, 124 and 150, 152 in the preferred embodiment are raised and lowered by hydraulic lifts 126 and 154. The arms 122, 124, 150 and 152 are of a size sufficient to extend upwardly through the openings 68A, 68B and 66A, 66B respectively in the carriage 38 (shown in FIG. 2). Each pair of lifting arms 122, 124 are lifted in unison by a single hydraulic lift 126 which is fixedly mounted to the frame 32. Lifting arms 150 and 152 are similarly lifted in unison by hydraulic lift 154. After the nailing operations are complete and the carriage 38 is in the "forward" position, the programmable computer means sends a signal to a pneumatic controller which energizes the lifts 154 and 126. In response to fluid pressure on the cylinders, the lifting arms 122, 124 and 150, 152 move in a direction indicated by arrow 128. The lifting arms 122, 124, 150 and 152 raise the nailed arrangements out of the tooling 40 and 42. Upon relieving the fluid pressure in the hydraulic lifts 126, 154 the lifting arms 122, 124 and 150, 152 retract and move in a direction opposite the direction shown by arrow 128.

Figure 8:
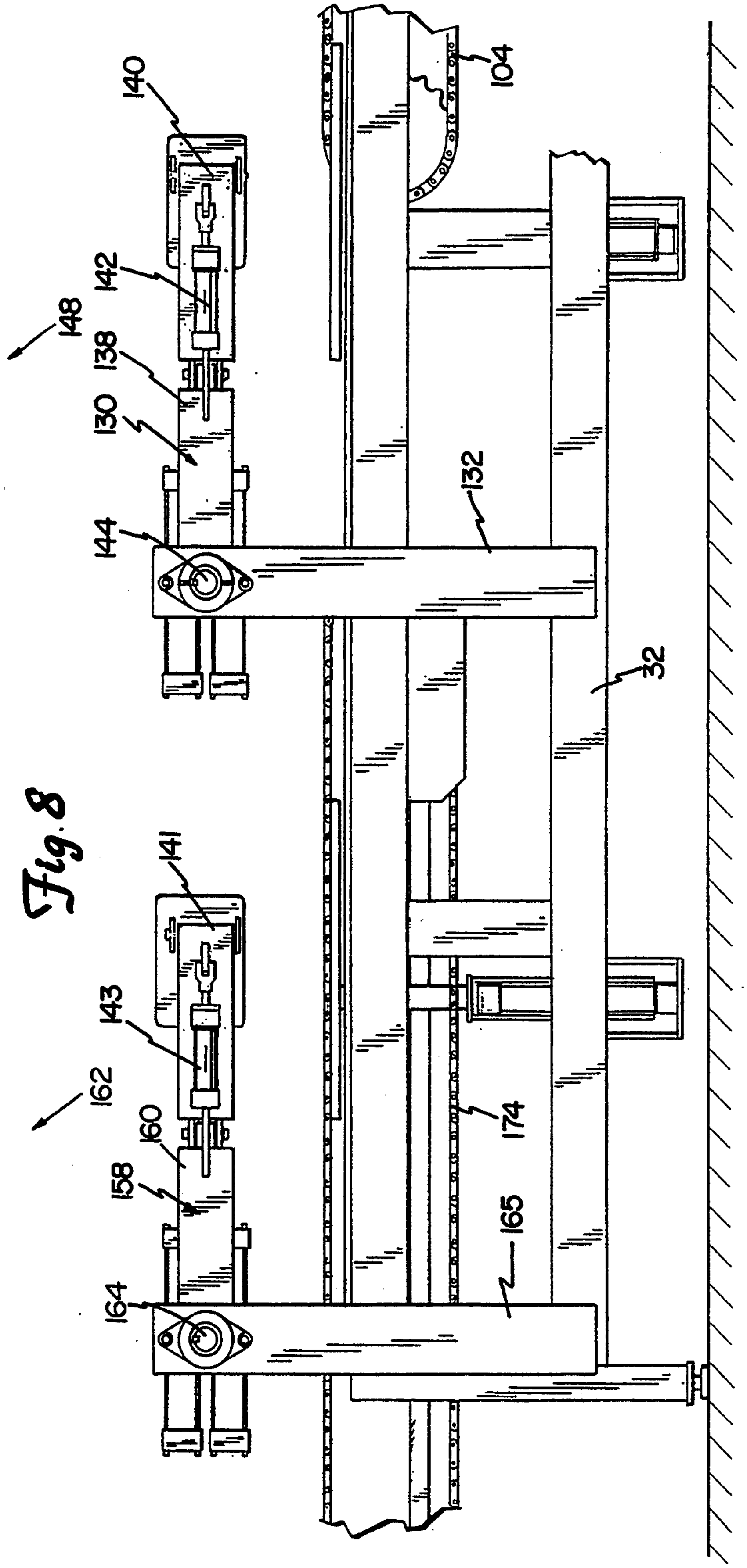
FIG. 8 is a detailed side-elevational view of a preferred embodiment showing the gripping arms of the preferred embodiment.

The device of the present invention further includes a first pair of spaced apart gripping arms 130 and a second pair of gripping arms 158, an arm of each pair located on opposite sides of the device of the present invention as shown in detail in FIG. 8. The pairs of gripping arms 130 and 158 grasp the nailed arrangements and suspend the nailed arrangements above the carriage 38 when the lifting arms 122, 124 and 150, 152 reach the desired elevation. Although only the gripping arms 130 and 158 are shown, mirror-image gripping arms are provided on the opposite side of the machine. Each pair of gripping arms 130, 158 has a fixedly mounted vertical member 132, 165 mounted to the frame 32, a cross member 134, 135 (shown in FIG. 4), a horizontally disposed shaft 136, 137 extending through the cross member (also shown in FIG. 4) arm portions 138, 160 pivotally mounted to the shafts 136, 137 a gripping plate assembly 140, 141 pivotally mounted to the arm portions 138, 160 and a hydraulic cylinder 142, 143 for moving the gripping plate assemblies 140, 141 inwardly toward opposing plates in the pair and in an opposite direction. Each gripping plate assembly 140, 141 is formed of a surface plate pivotally attached to a support plate. It is to be understood that the gripping arms 130, 158 are spaced on either side of the pair of chains 104 of the conveyor 34 (shown in FIG. 4) and are vertically positioned to capture nailed arrangements of components after the pairs of lifting arms 122, 124 and 150, 152 (shown in FIG. 4) raise the arrangements of nailed components to an elevation disposed between the oppositely spaced pairs of gripping plate assembly 140, 141.

Figure 9:
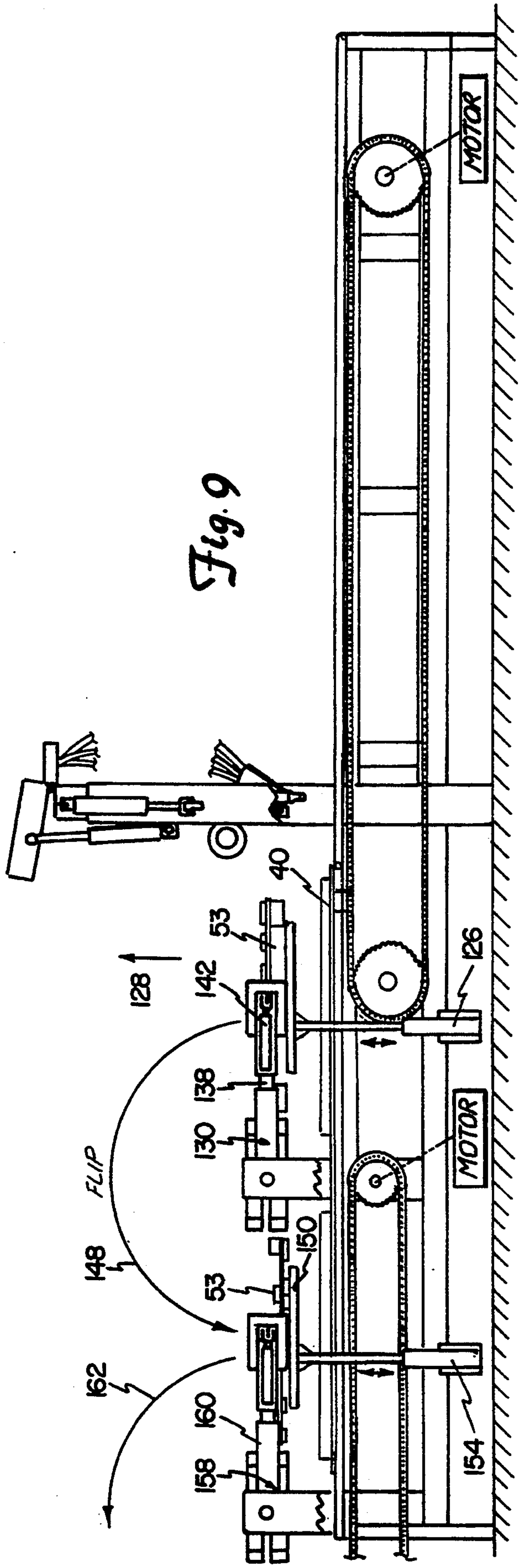
FIG. 9 is a side-elevational view of a preferred embodiment showing the operation of the lifting arms.

In the preferred embodiment, the first pair of arm members 138 rotate in unison about a pivotal axis defined as an axis of rotation 144 of shaft 136 (shown in FIG. 4). Similarly, the second pair of arm members 160 rotate in unison about a pivotal axis defined as an axis of rotation 164 of shaft 137 (shown in FIG. 4). In operation, as shown in FIG. 9 after the carriage 38 has reached the "forward" position, where the lifting arms 122, 124 and 150, 152 are positioned directly beneath the openings 68A, 68B, 66A and 66B respectively (shown in FIG. 2) of the carriage 38, the hydraulic lifts 126 and 154 are actuated to raise the arrangement of nailed components such as a pallet upwardly in the direction shown by arrow 128. When the lifts 122 and 154 reach the preselected height, hydraulic cylinders 142 and 143 are activated to move the plate assemblies 140 and 141 toward a center line 146 (shown in FIG. 4) until each nailed arrangement previously contained in the tooling 40 and 42 is firmly held in place between the oppositely spaced gripping plate assemblies 140 and 141.

Then, each pair of gripping arms 138, 160 rotate in a direction shown by arrows 148 and 162 approximately 180°. The sub-assembly 53 previously in the first tooling 40 is repositioned on the second set of lifting arms 150 which is an upwardly extended position.

The assembly coming out of the tooling 42 is off-loaded by activating the actuator 143 after the pallet has been turned 180°. The assembly coming out of tooling 40 is deposited onto a second conveyor 172 which will be described in more detail below.

The lifting arms 150, 152 are positioned above an upper surface of the carriage 38 through the openings 66A, 66B in the carriage to receive the inverted, nailed sub-assembly 53 from the first tooling 40 such that the sub-assembly 53 can be lowered into the second tooling 42 of the carriage thereby exposing the opposite surface to be nailed. The second pair of gripping arms 158 assist in aligning the sub-assembly 53 and release the sub-assembly 53 to be lowered directly above the second tooling 42 such that when the hydraulic lift 154 lowers the lifting arms 150, 152, the inverted sub-assembly 53 is properly aligned in the second tooling 42.

Referring back to FIG. 8, it is to be understood that arms 160 and 138 pivot in a direction shown by arrows 162 and 148, respectively and also in the opposite direction. In the preferred embodiment, each arm 160 and 130 moves a total range of approximately 180°.

Figure 10:
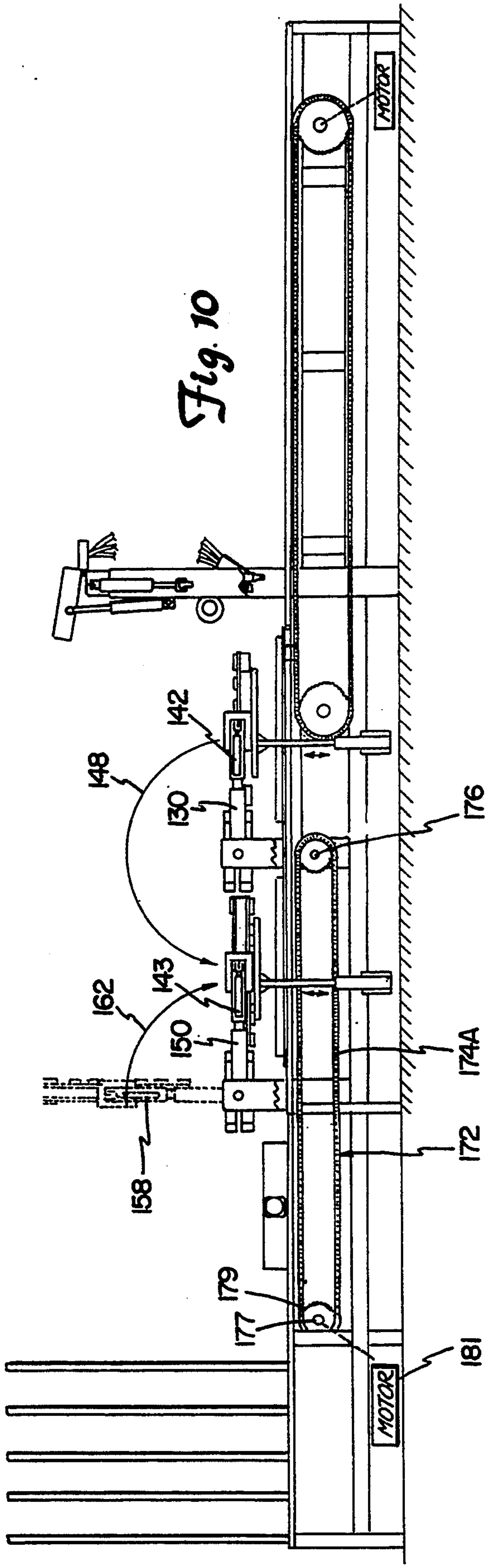
FIG. 10 is a schematic side-elevational view of the preferred embodiment showing the second conveyor and a preferred nesting operation of the gripping arms.

An additional means for removing nailed arrangements of components from the means for retaining the arrangements of components in the preferred embodiment is shown in FIG. 10. A second conveyor 172 is mounted within the frame 32. The second conveyor 172 has a pair of spaced apart horizontally disposed chains 174 which each have a path disposed in a vertical plane and which are shown as chains 174A and 174B in FIG. 4. The chains 174A and 174B are horizontally spaced within the frame 32 and are located on either side of the lifting arms 150 and 152 in the preferred embodiment. A shaft 176 is transversely mounted for rotation in the frame 32. A pair of spaced apart sprockets 178A and 178B are fixedly mounted and spaced apart on the drive shaft 176. The drive chains 174A and 174B engage the sprockets 178A and 178B, respectively.

At the opposite end, another substantially identical horizontally disposed shaft 177 and a pair of fixedly mounted sprockets 179 are mounted for rotation within the frame 32. A drive means comprising a gearbox and motor assembly 181 is coupled to the shaft 177. The controller preferably sends signals to the motor 181 instructing the motor assembly 181 to move the conveyor 172 at a fixed rate of speed and substantially continuously during the operation of the preferred device.

An additional aspect of the device of the present invention shown in FIG. 4 includes a means for aligning arrangements of nail components transversely on the second conveyor 172. In the preferred embodiment, a pair of oppositely spaced alignment devices 180A, 180B are provided, each having a horizontal rail 182A, 182B for contacting a side of the nailed arrangements of components. Hydraulic rams 184A, 184B are mounted to the frame 32 and mounted to the rails 182A, 182B for causing the horizontal rail 182 to move toward a centerline 146 of the second conveyor 172. A pair of spaced apart support arms 186A, 186B and 187A, 187B are provided to maintain each horizontal rail 182A in parallel arrangement with the opposite horizontal rail 182B. As the nailed arrangements are deposited onto the second conveyor 172, the alignment devices 180A, 180B can slide the arrangement from side to side to aide in stacking operations. In particular, when one-sided pallets are being manufactured, it is desirable to push every other pallet being deposited onto the second conveyor 172 laterally such that the pallets nest and take up less vertical space per pallet in storage or in a truck, for example.

For purposes of this disclosure, a "one-sided pallet" is a nailed arrangement of components suitable for supporting goods to be stored on only an upper surface. The lower surface typically comprises a number of support beams but does not include a plurality of adjacent boards defining a lower surface. Typically, one-sided pallets are nailed only from an upper surface.

Referring back to FIG. 7, the nailing means of the present invention includes six nailing heads 72A through 72F. The nailing heads are mounted in pairs to the first movable member 71 of the upper support frame assembly 70. The first movable member 71 includes a horizontal "I" beam 188, an intermediate beam 200, a lower beam 202, three vertical spaced apart beams 204, 206 and 208 and a pair of vertical end plates 190A and 190B.

The present invention includes means for causing the nailing heads to move in a direction normal to a machine direction relative to an arrangement of components to be nailed and in an opposite direction. In the preferred embodiment, hydraulic lifts 194A and 194B raise and lower the nailing heads 72 relative to the arrangement to be nailed. The stationary portion 73 of the frame is positioned adjacent to end plates 190A and 190B and is fixedly mounted to the frame 32. In the preferred embodiment, brackets 192A and 192B fixedly mounted at opposite ends of the horizontal beam 188 are provided for attachment of an upper end of hydraulic cylinders 194A and 194B. Each hydraulic cylinder 194A and 194B has a hydraulic ram 196A and 196B attached at one end to a support bracket 198A and 198B fixedly mounted to the stationary portion of the frame 73. The height of the moving member 71 and also the nailing heads which are suspended from the movable member 71 may be adjusted by applying hydraulic pressure or relieving hydraulic pressure from cylinders 194A and 194B. Preferably, cylinders 194A and 194B provide for about two inches movement in the "Z" direction.

The nailing heads 72A through 72F according to the most preferred embodiment are mounted vertically in pairs 72A and 72B, for example, onto the movable portion 71 of the frame. According to the most preferred embodiment, each pair of nailing heads is suspended according to a novel means of suspension which will be described in more detail below.

The movable member 71 of the preferred embodiment of the present invention also includes a pair of spaced apart horizontal beams 200 and 202 which are vertically spaced and connected by vertical beams 204, 206 and 208, respectively. The vertical beams 204, 206 and 208 as well as the spaced apart horizontal beams 200 and 202 are fixedly mounted in relation to the horizontal beam 188 in the preferred embodiment. When fluid pressure is applied to hydraulic cylinders 194A and 194B, the entire assembly comprising horizontal beams 188, 200 and 202 and vertical beams 204, 206 and 208, respectively, move in unison.

The entire the movable portion 71 of the support frame including the horizontal beam 188 described above as well as the stationary portion 73 constitute a portion of the means for causing the nailing heads to move in a direction normal to a machine direction relative to an arrangement of components.

A means for causing at least one of the nailing heads to move in a direction transverse to a machine direction relative to the nailing surface during a nailing operation in the preferred embodiment comprises a first horizontal shaft 210 and a second horizontal shaft 212. Each shaft 210 and 212 is mounted for rotation in the stationary portion 73 of the upper support frame assembly 70. Shafts 210 and 212 have coarse threads on their outer surfaces. Each half of shaft 210 is threaded in an opposite direction in the preferred embodiment. Shaft 210 is driven by means of a servo motor 214 coupled to shaft 210. A programmable controller (not shown) sends a signal to the servo motor 214 which instructs the servo motor to rotate the shaft. Similarly, a programmable controller (not shown) sends a signal to servo motor 212 which is coupled to shaft 212. Shaft 212 rotates in response to the signal.

A novel means for mounting each nailing head 72 to the movable portion 71 of the frame is provided which permits movement of the nailing heads 72 in the "Y" direction. The "Y" direction is a direction transverse to a direction of travel of the carriage 38 during normal operation.

When the movable assembly 71 comprising the horizontal support beam 188 moves in the "Z" direction as shown by arrow 220, both the first and second horizontal shafts 210 and 212 remain stationary in the "Z" direction. While the servo motors 214 and 216 are rotating the shafts 210 and 212, respectively, the pairs of nailing heads 72A and 72B, 72C and 72D and 72E and 72F move in the "Y" direction 218 in response to signals from a programmable controller (not shown).

Preferably, the nailing heads 72A through 72F of the present invention are mounted in pairs on the movable portion 72 of the upper support frame assembly 70.

Figure 11:
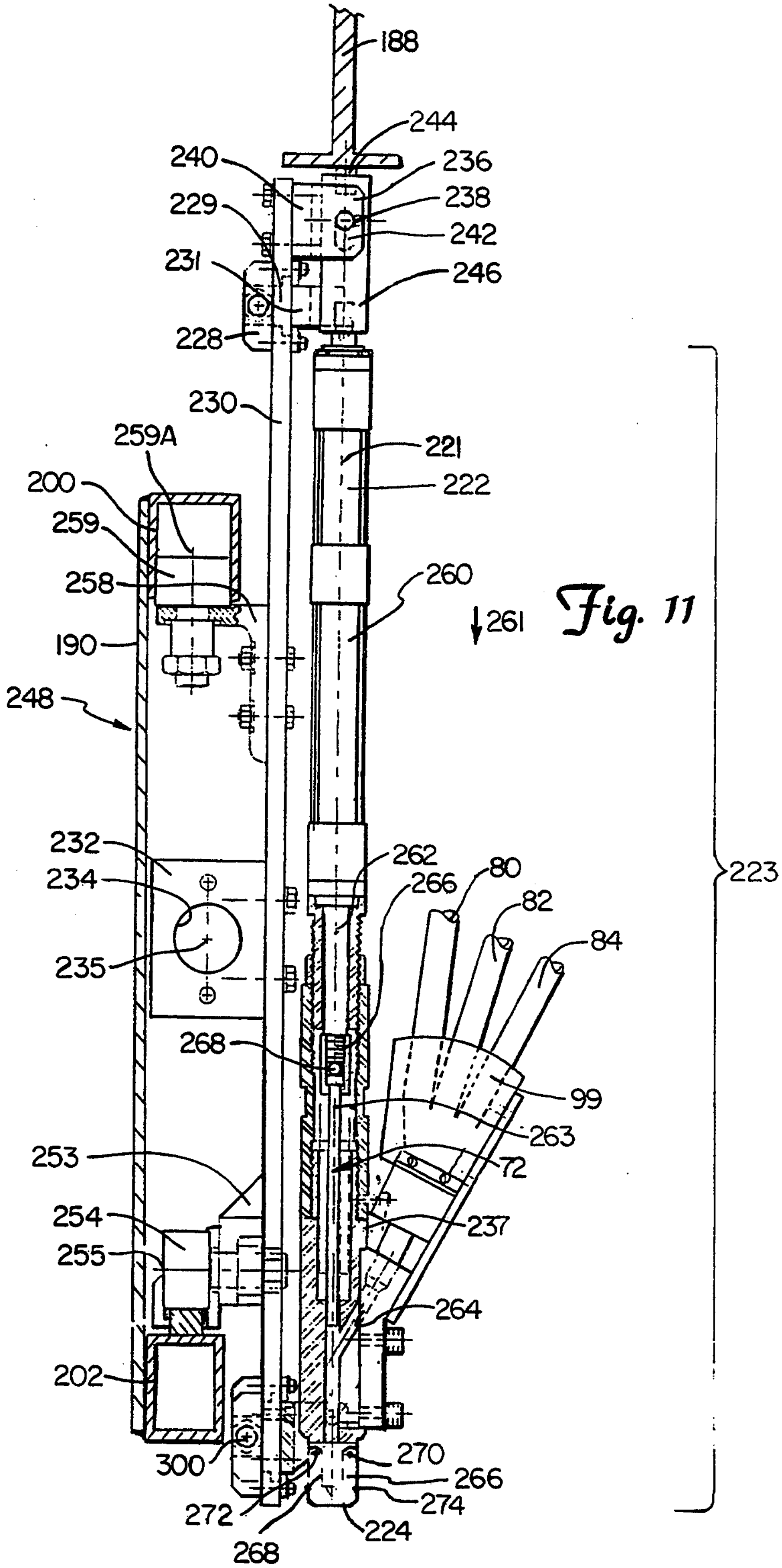
FIG. 11 is a cross-sectional view taken along line 11—11 as shown in FIG. 7 showing details of the preferred nailing assembly.

A novel means for mounting each nailing head 72 to the movable portion 71 of the frame is provided. A detailed side cross-sectional view of a nailing head and mounting assembly taken along line 11—11 as shown in FIG. 7 is shown in FIG. 11. Each nailing head 72 according to the preferred embodiment has a central nailing axis 221 and a pair of hydraulic cylinders 222 and 260 mounted along the nailing axis 221. The lower hydraulic cylinder 260 is fixedly mounted at a lower end to the nailing head 72 and has a driving ram 262 which is connected to a driving pin 263 by means of a coupling 266.

An additional means for causing the nailing heads to move in a direction normal to a machine direction relative to an arrangement of components and in an opposite direction includes upper cylinder 222. The upper cylinder 222 has a ram (not shown) which drives the entire nailing head downward in a direction shown by arrow 261. Upon application of fluid pressure, the upper cylinder 222, lower cylinder 260 and nailing head move downwardly until a lower end 224 of the nailing head contacts the surface being nailed. The upper cylinder 222, lower cylinder 260 and nailing head 72 are collectively referred to as the nailing assembly 223.

The cylinders 222 advantageously permit independent adjustment of each nailing head 72 in the "Z" direction, which is normal to an upper surface of the carriage 38. Preferably, cylinders 194A, 194B (shown in FIG. 7) adjust the position of each head 72A through 72F in unison in the "Z" direction, while cylinders 222 independently adjusts the position of each head 72 in the "Z" direction. The combination of means for adjusting the relative position of the heads in a direction normal to the machine direction described above advantageously permits use of the device with arrangements of varying height, and also permits compensation for variations in height within a single arrangement. For example, when nailing block pallets, it is desirable to nail through stringers and into blocks and also through surface boards and stringers in the same nailing operation. Since the surface boards are positioned above the stringers, independent adjustment of nailing heads 72 in the "Z" direction permits nailing through surfaces not located on the same horizontal plane. Similarly, the adjustment feature described above compensates for warpage in the boards.

Each nailing assembly 223 at an upper end is mounted into a rectangular block 246. Two assemblies 223 are mounted to a vertical support plate 230 by means of a pair of brackets 240 mounted to the plate 230. A flexible member 244 such as a rubber grommet is nested in an upper end of the block 246 for cushioning contact with a lower surface of the beam 188.

The grommet 244 allows the assembly 72 to apply an upward force to the beam 188 upon applying fluid pressure to hydraulic cylinder 222. In the preferred embodiment, three plates 230 are provided. Each plate includes a bracket 232 with a threaded aperture 234 for receiving the threaded portions of the first and second threaded shafts 210 and 212. The brackets are disposed on a surface opposite the surface which faces the pair of assemblies 223. The threaded apertures 234 have a central axis 235 which is identical to a central axis of the shaft 210 (shown in FIG. 7). The vertical height of the bracket 232 for mounting the central pair of assemblies is located above bracket 232 in this drawing since the shaft 212 which drives the central pair of assemblies is located above the shaft 210 in the "Z" direction in the preferred embodiment.

Figure 13:
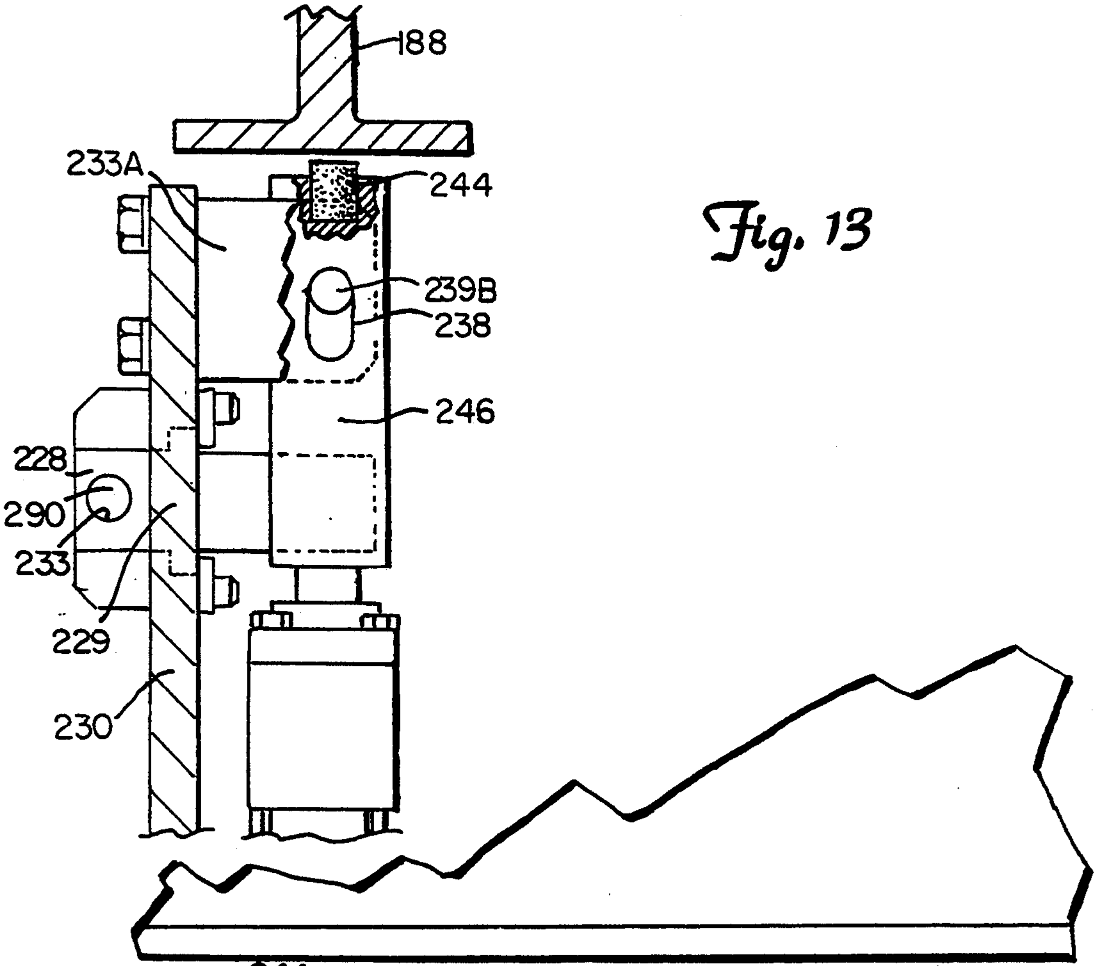
FIG. 13 is a detailed side-elevational view of the preferred means of manually adjusting spacing between pairs of nailing heads 72A and 72B.
Figure 12:
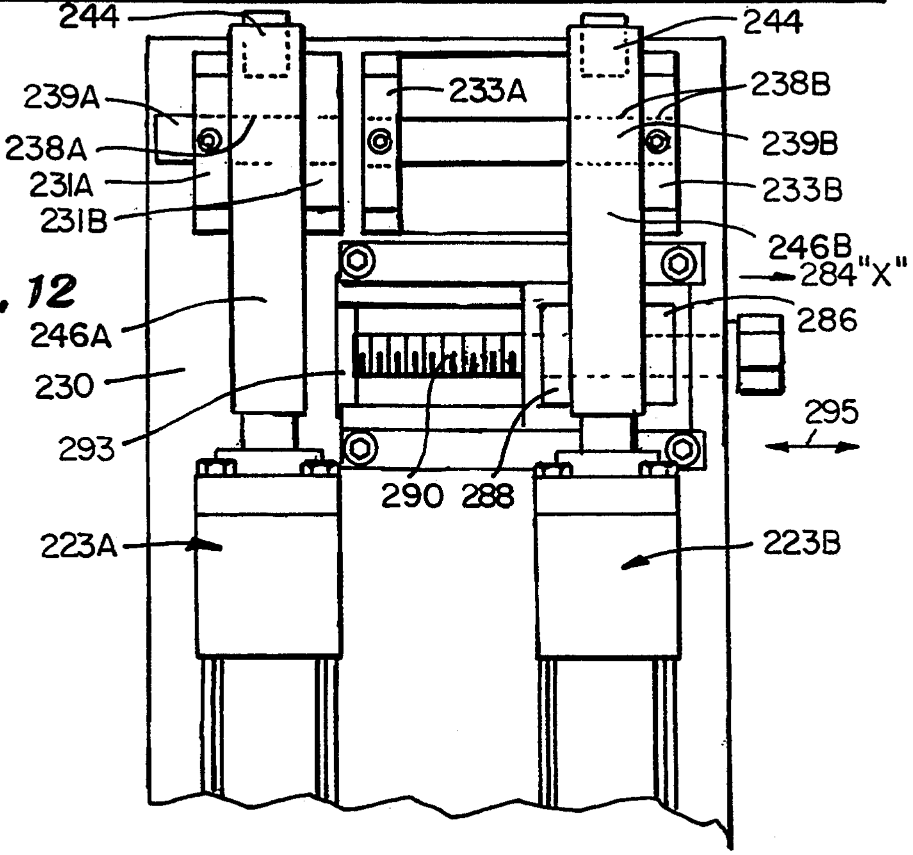
FIG. 12 is a detailed front-elevational view of a preferred means for manually adjusting a spacing between pairs of nailing heads 72A and 72B of the preferred embodiment.

The novel means of mounting each assembly 223 in the preferred embodiment includes a top mounting arrangement shown in detail in FIGS. 12 and 13. Each block 246A, 246B as shown in FIG. 12 has a horizontally disposed opening 238 extending through the block 246. Pins 239A, 239B extend through the elongated openings 238 and are fixedly mounted in opposite ears 231A, 231B and 233A, 233B of bracket 240. The pins 239A and 239B are separate so that the assemblies 223A and 223B can move independently in the "Z" direction. A second bracket 228 extending from the vertical mounting plate 230 is provided on the assembly 223B shown on the right hand side of FIG. 12.

Figure 14:
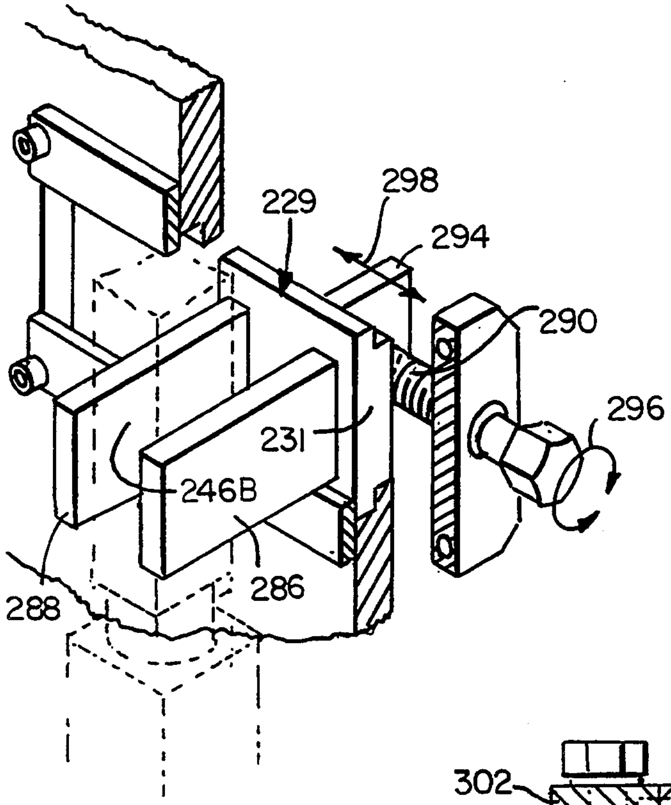
FIG. 14 is a detailed perspective view of an upper adjustment bracket.

The bracket 228 is bolted through the vertical plate 230 as shown in FIG. 13. A sliding member 229 is positioned within the bracket. A more detailed perspective view of the bracket 228 and sliding member 229 is shown in FIG. 14. The sliding member 229 has two spaced apart arms 286, 288, mounted to a plate 231 at right angles to the plate which engage opposite sides of the block 246B (shown in phantom). The sliding member 229 also has an opposite ear 294 extending from an opposite surface of the plate 231. A threaded opening 233 (shown in FIG. 13) accepts an adjustment screw 290. As shown in FIG. 12, an end of the screw 290 opposite the end to be turned is bolted to a plate 293. When the screw 290 is rotated, the arms 286, 288 push the entire assembly 223B in a direction transverse to a machine direction shown by arrow 295.

Since the ears 233A and 233B of the upper bracket 240 are spaced apart, the block 246B slides along pins 238B as the screw 290 rotates.

Such an arrangement allows the upper hydraulic cylinder 222 (shown in FIG. 11) to lower the nailing head 72 to the surface to be nailed, and then to raise the block end 246 until the grommet 244 is fully compressed and the upper end of the block 246 contacts the I-beam 188. The means of attachment described above advantageously allows for transverse movement on a less than perfectly straight beam 188 and still delivers the same amount of force during nailing to the arrangement to be nailed.

The means for causing at least one of the nailing heads to move in a direction transverse to a machine direction relative to the nailing surface during a nailing operation further comprises a sliding support assembly 248 mounted to a rear surface of each plate 230 as shown in FIG. 11. Each support assembly 248 includes a means for providing support to the vertically disposed nailing heads while the servo motors 214 and 216 drive shafts 210 and 212, respectively (shown in FIG. 6).

The preferred means for providing vertical support includes an upper support bracket 258 bolted to an upper portion of vertical plate 230. Disposed on an upper surface is a guide roller 259 mounted for rotation about vertical rotational axis 259A. The rollers 259 move within a channel of intermediate beam 200 (shown in FIG. 7) and aid in alignment of the nailing assembly 223 in the machine direction. An additional preferred means for providing vertical support includes a pair of brackets 250 fixedly mounted to the vertical support plate 230. Disposed on each bracket is a guide wheel 254 which rides upon an upper surface of horizontal beam 202. Each guide wheel 254 rotates about a horizontal axis 255 and supports the weight of the plate 230 and attached assemblies 223. Beams 200 and 202 are fixed in relation by vertical beams 204, 206 and 208 as well as end plates 190. Since the pair of assemblies 223 are supported at the bracket 232 having the threaded aperture on the beam 202, and are steadied by rollers 259 within a channel of beam 200, the entire assembly remains stable during movement in the "Y" direction 218 (shown in FIG. 6).

Figure 16:
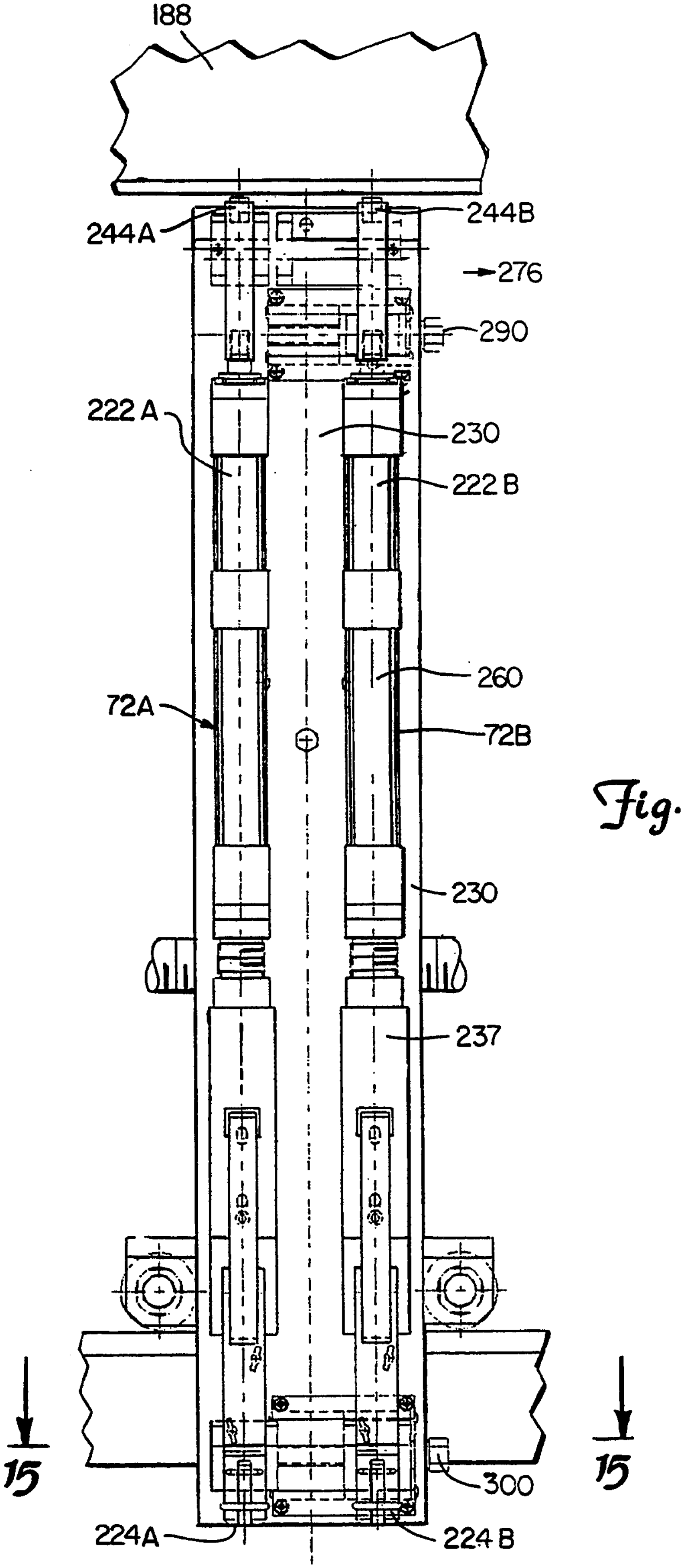
FIG. 16 is a front-elevational view of a pair of nailing head assemblies of the preferred embodiment.

The nailing means of the present invention includes a plurality of nailing heads 72 which can be of a type know in the art. Two novel nailing heads 72A and 72B are shown in front elevation in FIG. 16 and are mounted to a vertical plate 230. The nailing heads 72 each have a body 237 having an upper end mounted to a lower hydraulic cylinder 260. Referring back to FIG. 11, a hydraulic ram 262 of the cylinder 260 is coupled to a driving pin 263 located within a cavity of the body 237. The coupling 266 has an inner cavity for retaining a ball bearing 268. The coupling 266 and bearing 268 provide for rotational motion of the drive pin 263 in the event that threaded nails are being driven by the device of the present invention. If this is the case, the bearing 268 permits rotation of the drive pin 263. The preferred nailing head also includes a manifold 99 for joining together a plurality of nail tracks 80, 82 and 84 for feeding a nail into a passage 264 for delivering a nail to a terminal end 224 of the nailing head 72.

According to the preferred embodiment, a pair of pivotally mounted jaws 266 and 268, mounted for rotation about pivotal axes 270 and 272 are provided for passing nails from the nailing passage 264 into the arrangement to be nailed. Preferably, a means for retaining the jaws 266 and 268 in a closed position before driving the nail by means of applying fluid pressure to hydraulic cylinder 260 is provided which includes a retaining ring 274 in the preferred embodiment. The preferred retaining ring is formed from an elastomeric material such as butyl rubber. The retaining ring holds the jaws 266 and 268 together thereby preventing a nail from passing out of a terminal end 224 of the nailing head 72 prior to applying fluid pressure to cylinder 260.

A suitable nailing head for use in accordance with the present invention is described in co-pending application assigned to the same assignee as the present application, entitled COMPENSATING NAIL-DRIVING CHUCK FOR PALLET-MAKING MACHINE filed on even date herewith and hereby incorporated by reference. The nailing head 72 advantageously is adjustable in length along a main body 237 portion without requiring removing the assembly 223 from the plate 230 or requiring disassembly of the manifold 99. By lengthening the body of a portion of the nailing head below the second cylinder 260, the drive pin 263 is capable of providing countersink when nailing into a surface.

Figure 15:
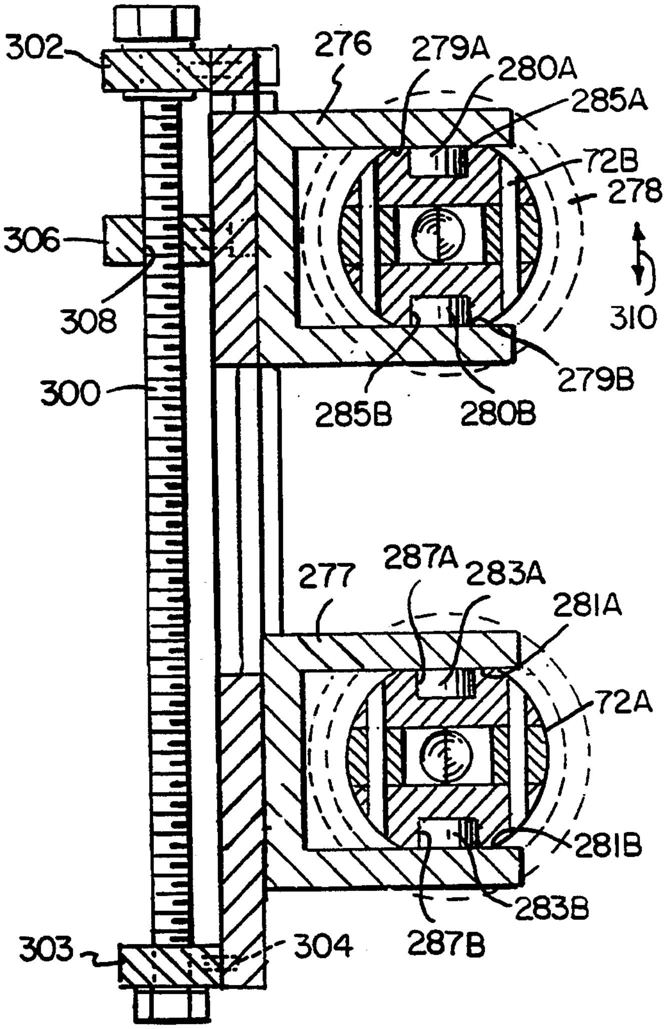
FIG. 15 is a detailed cross-sectional view taken along line 15—15 shown in FIG. 16 showing a lower means for manually adjusting spacing between the nailing heads 72A and 72B.

An expanded view of an additional means for manually adjusting relative position of two assemblies mounted on a single support plate 230 is shown in FIG. 15. Proximate a lower edge of support plate 230 are fixedly mounted a pair of horizontally spaced apart support brackets 276, 277 for sliding engagement in the "Z" direction with an outer surface of a lower body portion 278 of each nailing head 72. Preferably, an outer surface of the lower portion 278 of the body has two vertically disposed parallel flat surfaces 279A, 279B and 281A, 281B for sliding engagement with an inner surface of each support bracket 276, 277.

Most preferably, each support bracket 276,277 has an inwardly projecting detent 280A, 280B, and 283A, 283B for contacting a pair of vertical grooves 285A, 285B and 287A and 287B within each flat outer surface 279A, 279B, and 281A, 281B which prevents movement of the lower portion of the body 278 in the machine direction.

An adjustment screw 300 is provided which allows for the same degree of adjustment as achieved when turning adjustment screw 290. The screw 300 is mounted between brackets 302 and 303 which remain stationary while the set screw 300 rotates. Bracket 302, 303 are fixed in relation by means of beam 304. The nailing head 72A is fixedly mounted to the beam 304. The beam 304 is slotted (not shown) to receive a bracket 306 having a threaded aperture for receiving screw 300. Upon rotation of screw 300, the nailing head 72B moves in directions indicated by arrow 310.

The preferred embodiment of the device of the present invention also includes a computer means for controlling the operation and sequence of the device of the present invention. The nailing patterns for each nailing operation are determined, and a location and nail selection is inputted into the computer for every nail comprising the nailing pattern. The computer means then controls carriage location, nailing head location, timing of delivery of nails, inverting unloading operations by means known in the art.

The preferred method of operation of the device of the present invention will now be explained in detail. Referring back to FIG. 1, the carriage 38 is moved to a "home" position for loading. An arrangement of components to be nailed is placed in the first tooling 40. The computer means is programmed to deliver a preselected nailing pattern including one or more nail sizes to an upper surface of the arrangement of components in the first tooling 40. When the unit is energized, the servo motor 118 of the first conveyor 34 (shown in FIG. 4) energizes and moves the carriage 38 in the direction shown by arrow 50 until a leading edge 55 of the arrangement 53 is positioned beneath the nailing station 44. During the nailing operation, the controller activates a control loop (not shown) employing hydraulic means to control the operation of the nailing heads. A suitable method of controlling fluid flow to the nailing heads is described in co-pending application assigned to the same assignee as the present application, entitled CONTROL METHOD FOR HYDRAULIC ACTUATORS, filed on even date herewith and hereby incorporated by reference. The carriage 38 continues to move in the direction shown by arrow 50 while each of the nailing heads delivers a preselected nail size to a predetermined location on an upper surface of the arrangement 316. While the carriage 38 is moving in the direction by indicated by arrow 50, each pair of nailing heads 72A and 72B, for example, move in the "Z" direction shown by arrow 318 and also in a direction transverse to a direction of travel shown by arrow 50 in response to signals from the controller representative of the selected nailing pattern to be delivered to an upper surface of the arrangement 316. At the completion of the first nailing operation, the carriage 38 moves in the direction indicated by arrow 50 until the first tooling 40 is positioned directly above the lifting arm 122. The controller sends a signal to the servo motor 118 of the first conveyor 34 (shown in FIG. 4) and instructs the servo motor to hold the carriage 38 stationary relative to the frame 32.

Then, the controller activates a control loop (not shown) which applies hydraulic pressure to the hydraulic lifter 126 causing the lifting arm 122 to raise the arrangement 53 out of the first tooling 40. The controller then instructs the first pair of gripping arms 130 to grasp opposite sides of the arrangement 53 and then to retract lifting arm 122 to its original position. Then, the controller instructs lifting arms 158 to raise, then arms 130 to pivot such that gripping arms 130 invert and position the arrangement 53 above the second tooling 42 in the carriage 38. The controller activates a control loop (not shown) which applies fluid pressure to a second hydraulic lift 154 which raises lifting arm 150 to a lower surface of the arrangement. The controller signals the hydraulic cylinders 142 of the first pair of gripping arms 130 to release the arrangement 316. Then, the hydraulic lift 154 lowers the lifting arm 150 and the inverted arrangement 316 into the second tooling 42 of the carriage 316.

The control means next instructs the servo motor 118 (shown in FIG. 4) to move the carriage 38 back to its original position and to rotate the gripping arms 130 and 158 back to their original position. The arrangement 316 remains in the second tooling 42 and the first tooling 40 is now empty. An operator places another arrangement of components to be nailed in the first tooling and adds additional components to the second tooling to perform a second nailing operation.

Preferably, the computer means is programmed to deliver a second nailing pattern different from the first nailing pattern to the inverted assembly. The device is capable of alternating nailing patterns between nailing operations. The servo motor is energized to bring the original inverted arrangement 53 with the added on elements under the nailing head 72 and instructs the nailing station 44 to nail according to a second selected pattern. Then, the controller instructs the servo motor to bring the next arrangement which was identical to the first arrangement 53 before inversion under the nailing head 72 for applying the first selected nailing patter to an upper surface. At the completion of the second nailing operation, the servo motor is instructed to move the carriage 38 in a direction indicated by arrow 50 until the second tooling is centered above the second lifting arm 150 and the first tooling 40 is centered above the first lifting arm 126. With nailed arrangements in both toolings, the controller instructs both lifting arms 150 and 122 to be elevated by hydraulic lifts 154 and 126. The gripping arms 130 and 158 are instructed to grasp then invert the nailed arrangements in sequence. Preferably, gripping arms 158 first invert the pallet which has been nailed on both sides and deposits the pallet onto the second conveyor 172 (shown in FIG. 4) which either delivers each pallet to a stacking machine or assists in nesting the pallets for more economical storage and shipping.

The controller preferably controls the function of the gripping arm 158 such that every other nailed pallet placed onto the second conveyor is inverted relative to the last. If one-sided pallets are being manufactured with this device, by inverting every other pallet, the pallets are capable of nesting and taking up less vertical space than otherwise required. The preferred means of nesting will be described below.

After hydraulic lifts 154 and 126 raise lifting arms 150 and 122 into a position for activating gripping arms 130 and 158, gripping arms 158 rotate in a direction shown by arrow 162 but stop in a substantially vertical position at twelve o'clock as shown in FIG. 10. Then, gripping arms 130 rotate in a direction shown by arrow 148 while the carriage 38 remains above lifting arms 150 and 122 respectively. The controller then activates the hydraulic cylinders 142 to release the nailed arrangement onto lifting arm 150 so that the arrangement can be lowered into the second tooling 42. Then, the controller instructs the servo motor 118 (shown in FIG. 4) to move the carriage back to the home position. Then, the second pair of gripping arms 158 rotate in a direction opposite the direction shown by arrow 162 and the hydraulic cylinder 143 similar to cylinder 142 is activated to release the arrangement to be lowered onto upwardly extended lifting arms 150. Lifting arms 150 lower the pallet onto the second conveyor. After the next nailing sequence is complete, gripping arms 158 rotate 180° forward and drop the next pallet opposite side up from the last pallet onto the second conveyor 172 which in the preferred embodiment is moving continuously. In this way, a continuous stream of pallets is delivered to a stacking device where every other pallet is inverted relative to the adjacent pallets.

The device of the present invention also preferably provides an alternate nesting function which was described above in connection with the operation of the second conveyor 172 (shown in FIG. 4).

It is to be understood that during the nailing operations, the controller of the present invention sends signals to the servo motors 216 and 214 shown in FIG. 6 which continuously adjust a location of each pair of nailing heads 72 in a direction transverse to a machine direction between individual hits and during the nailing operation. The controller of the present invention also controls the height of the beam movable portion 71 of the upper support frame assembly 70 by controlling the fluid pressure to hydraulic cylinders 194A and 194B. The controller of the present invention also controls the timing and rate at which a terminal end of each nailing head contacts the arrangement to be nailed and applies hydraulic pressure in order to drive each nail into the arrangement. The controller of the present invention also controls the feed rate and the selection of nails to be feed to each nailing head 72 according to a preselected nailing pattern.

The method of the present invention is an automated method of nailing pallets in a single nailing operation which simultaneously uses a plurality of nailing heads. The method includes a first step of forming an arrangement of components to be nailed. The arrangement includes a plurality of adjacently arranged, preferably parallel surface boards, and a plurality of stringers positioned perpendicular to the surface boards and beneath the surface boards. A nailing pattern is selected for applying at least one type and size of nail through at least one of the surface boards and stringers. The method includes positioning the nailing heads and the arrangement such that each head nails substantially along a length of the stringer boards according to the selected nailing pattern. The method includes nailing through at least one of the stringer and surface boards in a path running along a length of each stringer during a single nailing operation. Preferably, the method also includes the step of inverting the arrangement and positioning a second group of stringer and surface boards on the inverted arrangement. The stringers are preferably placed in a direction as the nailed stringers.

The method also includes selecting a second nailing pattern for nailing through at least one of the second group of surface boards and stringers. The preferred method includes the step of nailing through at least one of the stringer and surface boards in a path running along a length of each stringer during a single nailing operation.

The method preferably includes a step of moving at least one of the nail heads in a direction parallel to a length of the first group of surface boards when nailing according to the first selected pattern. The preferred method also includes a step of moving at least one of the nail heads in a direction parallel to the length of the second group of surface boards while nailing according to the second selected nailing pattern. Preferably, the steps of selecting the first and second nailing patterns further include the step of inputting the selected patterns into a programmed computer means for controlling the motion of the arrangement relative to a position of the nailing heads.

Although the present invention has been described with reference to preferred embodiments, workers skilled in the art will recognize that changes may be made in form and detail without departing from the spirit and scope of the invention.

What is claimed is:

1. For use in a machine, a device for driving nails in a selected nailing pattern into an arrangement of components having at least one nailing surface during a nailing operation, the components thereafter being movable in a machine direction, comprising:
   - a frame;
   - retaining means for retaining the arrangement of components to be nailed within the frame, the retaining means moving in the machine direction;
   - nailing means for nailing the selected pattern into at least one of the nailing surfaces of the arrangement of components comprising a plurality of movable nailing heads mounted to the frame for delivering the selected nailing pattern to the nailing surface;
   - nail delivery means for delivering nails to the nailing heads;
   - means for causing at least one of the nailing heads to move in a direction transverse to the machine direction;

means for causing the nailing heads to move in the machine direction and in a direction opposite the machine direction; and means for automatically causing the nailing heads to move in a direction normal to both the machine direction and the transverse direction and to move in a direction opposite the normal direction.

2. The device of claim 1, and further comprising a means for removing nailed arrangements of components from the means for retaining the arrangement of components.

3. The device of claim 2, wherein the means for removing nailed arrangements comprises at least one pair of horizontally disposed, spaced apart lifting arms slidably mounted to the frame.

4. The device of claim 3 and further comprising pneumatic means for lifting and lowering the lifting arms.

5. The device of claim 3, wherein the means for removing nailed arrangements comprises at least one pair of horizontally disposed transversely spaced apart gripping arms, each having a gripping end for gripping the nailed arrangement and an opposite end, each mounted for rotation at the opposite ends on to either side of the frame.

6. The device of claim 5 and further comprising a pneumatic means for causing the gripping arms to move toward a nailed arrangement to be gripped, and a means for causing the gripping arms to rotate.

7. The device of claim 2 wherein the removal means further comprises a product removal conveyor comprising a pair of spaced apart horizontally disposed shafts mounted for rotation in the frame, a pair of sprockets fixedly mounted onto each shaft, a pair of chains, each engaging a sprocket of each shaft, and a means for driving at least one of the shafts.

8. The device of claim 1, wherein the frame includes a pair of spaced apart horizontally disposed rails, wherein the means for retaining the arrangement of components to be nailed comprises a carriage, the carriage having a plurality of rollers for engaging the rails.

9. The device of claim 8, wherein the carriage comprises clamping means for retaining at least one arrangement of components to be nailed on an upper surface of the carriage.

10. The device of claim 9, wherein the clamping means are removable and are sized to snugly retain two arrangements to be nailed.

11. The device of claim 9, wherein the clamping means comprises at least one anvil means for contacting driven nails and for bending a sharp end of the nails contacting the anvil means during driving.

12. The device of claim 1, wherein the frame includes an upper support frame assembly having a first movable portion and a second stationary portion, the first movable portion slidingly engaged in the second portion, the stationary portion fixedly mounted to the frame, wherein the means for causing the nailing heads to move in a direction normal to the machine direction relative to the arrangement of components and in an opposite direction comprises at least one hydraulic cylinder mounted at one end to the movable portion of the frame and at the opposite end to the stationary portion of the frame.

13. The device of claim 1, and further comprising an upper hydraulic cylinder and a lower hydraulic cylinder each cylinder having an upper end and a lower end and mounted along a central axis of the nailing head, such that the upper end of the lower cylinder is immediately adjacent to the lower end of the tipper cylinder, the lower cylinder having a ram fixedly connected to a portion of the nailing head, wherein the means for causing the nailing heads to move in the direction normal to the machine direction and in the opposite direction comprises the upper hydraulic cylinder mounted at an upper end to the movable portion of the frame and at a lower end to the upper end of the lower hydraulic cylinder.

14. The device of claim 13 wherein each nailing head includes a body with a central cavity, and a driving pin located within the cavity, wherein the nail driving means comprises the lower hydraulic cylinder including a ram, the ram being fixedly connected to a driving pin.

15. The device of claim 1, wherein the means for causing at least one of the nailing heads to move in a direction transverse to the machine direction relative to the nailing surface comprises a horizontally disposed threaded shaft, the shaft mounted for rotation in the frame, wherein each nailing head is mounted to a bracket having a threaded aperture for receiving a threaded portion of the shaft, and further comprising a motor mounted to the frame having an output shaft, a gearbox mounted to the frame having an output shaft coupled to the horizontally disposed shaft, an input shaft coupled to the output shaft of the motor, and a means for preventing rotation of the nailing heads about the shaft.

16. The device of claim 1, wherein the nailing means comprises a nail pan, a plurality of nail tracks each track having an elongated passage extending therethrough for fluidly connecting the nail pan to the nailing heads, and a valve means between the pan and nailing heads for controlling the delivery of the nails to the nail heads.

17. The device of claim 16 and further comprising means for delivering compressed gas to the nail tracks.

18. The device of claim 1, wherein the nailing heads are mounted to the frame in pairs, and each pair moves in the direction transverse to the machine direction in unison.

19. The device of claim 18 and further comprising means for manually adjusting a spacing distance between the nailing heads.

20. The device of claim 1, wherein each nailing head is adjustable in length for countersinking nails during nailing.

21. The device of claim 1 and further comprising programmable control means for controlling a position of the nailing heads relative to the nailing surface and the delivery of nails to the arrangement.

22. The device of claim 21, wherein the programmable control means is programmed to cause the nailing means to drive nails into the arrangement according to a preprogrammed nailing pattern.

23. The device of claim 1 wherein the means for causing the nailing heads to move in the machine direction relative to the arrangement of components and in the direction opposite the machine direction comprises a conveyor, the conveyor comprising:

a pair of horizontally disposed shafts mounted for rotation in the frame;

a pair of sprockets fixedly mounted in spaced apart relation on each shaft;

a pair of endless chains for engaging a sprocket of each shaft; and a servo motor coupled to an and of one of the shafts for driving the endless chains.

24. The device of claim 23, wherein the retaining means for retaining the arrangement of components to be nailed within the frame is mounted on a movable carriage, wherein the frame comprises a pair of spaced apart horizontal rails, and wherein the carriage comprises a plurality of glide wheels for engaging the rails and a coupling means for retaining the carriage in a relation to each endless chain.

25. The device of claim 1, wherein the nailing heads are mounted in pairs and each of the nailing heads in the pair is spaced apart by a selected distance, wherein the means for causing at least one of the nailing heads to move in the direction transverse to the machine direction causes each pair to move in unison; and further comprising means for adjusting the distance between the pair of nailing heads.

* * * * *

UNITED STATES PATENT AND TRADEMARK OFFICE

CERTIFICATE OF CORRECTION

PATENT NO. : 5,379,513

DATED : January 10, 1995

INVENTOR(S) : TERRENCE L. THOMPSON, JACK W. GRESHAM

It is certified that error appears in the above-indentified patent and that said Letters Patent is hereby corrected as shown below:

Col. 7, line 21, delete "detail-", insert --detail.--

Col. 20, line 1, delete "tipper", insert --upper--

Signed and Sealed this

Fourth Day of July, 1995

Attest:

Bruce Lehman

BRUCE LEHMAN

*Attesting Officer*

*Commissioner of Patents and Trademarks*